United States Patent
Ramamurthy et al.

(10) Patent No.: US 10,128,684 B2
(45) Date of Patent: Nov. 13, 2018

(54) ENERGY CONTROL VIA POWER REQUIREMENT ANALYSIS AND POWER SOURCE ENABLEMENT

(71) Applicant: Virtual Power Systems, Inc., Santa Clara, CA (US)

(72) Inventors: Shankar Ramamurthy, Saratoga, CA (US); Sushant Shankar, Saratoga, CA (US); Rajaram Soundararajan, Cupertino, CA (US); Andrew Sy, Fremont, CA (US); Andrew L Wang, Santa Clara, CA (US); Erich Karl Nachbar, Foster City, CA (US); K David Lin, San Jose, CA (US); Frank Chuang, Cupertino, CA (US); Rajeev P Huralikoppi, Sunnyvale, CA (US); Ryan Justin Kennedy, Charlotte, NC (US); Denis Kouroussis, Toronto (CA); Milind Kukanur, Los Gatos, CA (US); Pranthik Samal, Santa Clara, CA (US)

(73) Assignee: Virtual Power Systems, Inc., Milpitas, CA (US)

( * ) Notice: Subject to any disclaimer, the term of this patent is extended or adjusted under 35 U.S.C. 154(b) by 274 days.

(21) Appl. No.: 14/526,140

(22) Filed: Oct. 28, 2014

(65) Prior Publication Data
US 2015/0121113 A1    Apr. 30, 2015

Related U.S. Application Data

(60) Provisional application No. 61/896,504, filed on Oct. 28, 2013, provisional application No. 61/931,667, (Continued)

(51) Int. Cl.
*G06F 1/00* (2006.01)
*G06F 1/32* (2006.01)
(Continued)

(52) U.S. Cl.
CPC .............. *H02J 9/061* (2013.01); *G06F 1/263* (2013.01); *G06F 1/30* (2013.01); *G06F 1/3206* (2013.01);
(Continued)

(58) Field of Classification Search
CPC ................................... G06F 1/32; G06F 1/26
See application file for complete search history.

(56) References Cited

U.S. PATENT DOCUMENTS 5,428,523 A * 6/1995 McDonnal ................ H02J 1/10
                                                               307/58
6,396,170 B1    5/2002 Laufenberg et al.
(Continued)

FOREIGN PATENT DOCUMENTS

EP          2372861 B1    10/2011
JP       2009232521 A    10/2009
(Continued)

OTHER PUBLICATIONS

International Search Report dated Feb. 9, 2015 for PCT/US2014/062650.
(Continued)

*Primary Examiner* — Phil Nguyen
(74) *Attorney, Agent, or Firm* — Adams Intellex, PLC

(57) ABSTRACT

Disclosed are systems and methods to provide energy control via power-requirement analysis and power-source enablement. Both demand-side and supply-side techniques are used alone or in conjunction to determine an optimal number of power sources to supply power to one or more loads. When fluctuations in power requirements are present, measures such as decoupling less-critical loads in order to continue delivering power to critical systems and turning on and off power sources as needed to meet the current power demands of a system are implemented. Power sources are (Continued)

periodically deactivated by the system on a rotational basis such that all power sources wear evenly, prolonging the life of the equipment. A scalable architecture that allows the virtualization of power from the underlying hardware form factor is also provided.

45 Claims, 18 Drawing Sheets

Related U.S. Application Data filed on Jan. 26, 2014, provisional application No. 61/970,390, filed on Mar. 26, 2014, provisional application No. 61/985,617, filed on Apr. 29, 2014, provisional application No. 62/029,226, filed on Jul. 25, 2014, provisional application No. 62/033,618, filed on Aug. 5, 2014, provisional application No. 62/047,593, filed on Sep. 8, 2014, provisional application No. 62/057,127, filed on Sep. 29, 2014.

(51) Int. Cl.
*H02J 9/06* (2006.01)
*G06F 1/30* (2006.01)
*G06F 1/26* (2006.01)
*H02J 7/00* (2006.01)

(52) U.S. Cl.
CPC ............ *H02J 7/0063* (2013.01); *H02J 9/062* (2013.01); *H02J 2007/0067* (2013.01); *Y10T 307/344* (2015.04)

(56) References Cited

U.S. PATENT DOCUMENTS

| | | | |
|---|---|---|---|
| 6,967,283 B2 | 11/2005 | Rasmussen et al. | |
| 7,236,896 B2 | 6/2007 | Farkas et al. | |
| 7,904,734 B1* | 3/2011 | Singla ................ | G06F 1/263 713/300 |
| 8,193,662 B1 | 6/2012 | Carlson et al. | |
| 8,464,080 B2 | 6/2013 | Archibald et al. | |
| 8,527,619 B2 | 9/2013 | Ewing et al. | |
| 8,595,379 B1 | 11/2013 | Brandwine | |
| 8,958,923 B2 | 2/2015 | Kake et al. | |
| 9,641,025 B2 | 5/2017 | Agrawal et al. | |
| 2003/0056125 A1* | 3/2003 | O'Conner ............ | G06F 1/26 713/300 |
| 2005/0067902 A1* | 3/2005 | Bemat ................ | G06F 1/3203 307/140 |
| 2005/0071092 A1* | 3/2005 | Farkas ................ | H02J 3/14 702/60 |
| 2005/0086544 A1* | 4/2005 | Egan ................... | G06F 1/30 713/300 |
| 2005/0120250 A1* | 6/2005 | Adachi ............... | G06F 1/26 713/300 |
| 2005/0162019 A1 | 7/2005 | Masciarelli et al. | |
| 2007/0216229 A1* | 9/2007 | Johnson, Jr. ........ | G06F 1/30 307/86 |
| 2008/0320322 A1 | 12/2008 | Green et al. | |
| 2009/0089792 A1* | 4/2009 | Johnson ............. | G06F 9/4881 718/105 |
| 2009/0119064 A1* | 5/2009 | Brundridge ......... | G01R 31/40 702/182 |
| 2009/0144568 A1* | 6/2009 | Fung .................. | G06F 1/3203 713/300 |
| 2010/0037070 A1* | 2/2010 | Brumley ............. | G06F 1/3209 713/300 |
| 2010/0058092 A1* | 3/2010 | Bougaev ............. | G06F 1/28 713/340 |
| 2010/0077238 A1* | 3/2010 | Vogman .............. | G06F 1/263 713/310 |
| 2010/0205469 A1* | 8/2010 | McCarthy ........... | G06F 9/5061 713/324 |
| 2010/0211810 A1 | 8/2010 | Nacho | |
| 2010/0264741 A1* | 10/2010 | Togare ............... | G06F 1/263 307/80 |
| 2010/0328849 A1 | 12/2010 | Ewing et al. | |
| 2011/0133559 A1 | 6/2011 | Yamashita et al. | |
| 2011/0264937 A1 | 10/2011 | Meisner et al. | |
| 2011/0302432 A1 | 12/2011 | Harris et al. | |
| 2012/0066519 A1 | 3/2012 | El-Essawy et al. | |
| 2013/0232362 A1* | 9/2013 | Zhou .................. | G06F 1/263 713/323 |
| 2014/0173612 A1* | 6/2014 | Haydock ............. | G06F 9/50 718/104 |
| 2015/0177814 A1* | 6/2015 | Bailey ................ | G06F 1/26 713/320 |
| 2016/0209901 A1 | 7/2016 | Wilcox et al. | |
| 2016/0282892 A1* | 9/2016 | Saavedra ............ | G05F 1/66 |

FOREIGN PATENT DOCUMENTS

| | | |
|---|---|---|
| WO | WO2011119444 A2 | 9/2011 |
| WO | WO2012091323 A2 | 7/2012 |

OTHER PUBLICATIONS

International Search Report dated Jan. 30, 2015 for PCT/US2014/062684.
Metcalf, Jeffrey, "Power Efficiency Comparison: CISCO UCS® 5108 Blade Server Chassis and HP BladeSystem® c7000 Enclosure", Copyright Sep. 2013, Cisco.
"VMware® Distributed Power Management Concepts and Use", White Paper, Copyright 2010 VMware, Inc., 3401 Hillview Avenue Palo Alto CA 94304 USA.
Mammano, Bob, "Load Sharing with Paralleled Power Supplies", Copyright 2001, Texas Instruments Incorporated, Dallas, Texas.
Muccini, Mark, el al., "Power Consumption Reduction: Hot Spare", A Dell technical white paper, Feb. 2012, Rev. 1.0, Dell, Inc.
Meisner, David, Brian T. Gold, and Thomas F. Wenisch. "PowerNap: eliminating server idle power." ACM SIGARCH Computer Architecture News 37.1 (2009): 205-216.

* cited by examiner

ENERGY CONTROL VIA POWER REQUIREMENT ANALYSIS AND POWER SOURCE ENABLEMENT

RELATED APPLICATIONS

This application claims the benefit of U.S. provisional patent applications "Intelligent Control of Energy and Power Management" Ser. No. 61/896,504, filed Oct. 28, 2013, "Intelligent Power Control" Ser. No. 61/931,667, filed Jan. 26, 2014, "Dynamic Power Control Through Resource Allocation" Ser. No. 61/970,390, filed Mar. 26, 2014, "Dynamic Power Capacity Allocation" Ser. No. 61/985,617, filed Apr. 29, 2014, "Multi-Level Data Center Consolidated Power Control" Ser. No. 62/029,226, filed Jul. 25, 2014, "Multi-Level Dynamic Power Control Through Capacity Allocation" Ser. No. 62/033,618, filed Aug. 5, 2014, "Energy Control Via Power Requirement Analysis and Power Source Enablement" Ser. No. 62/047,593, filed Sep. 8, 2014, and "Intelligent Control Of Energy For Rack Level Consolidated Power Systems" Ser. No. 62/057,127, filed Sep. 29, 2014. The foregoing applications are each hereby incorporated by reference in their entirety.

FIELD OF ART

This application relates generally to power control, and more particularly to energy control via power requirement analysis and power source enablement.

BACKGROUND

Electricity is used for powering a wide variety of devices, across areas such as manufacturing, air conditioning, and information technology (IT), to name a few. Electricity can be delivered as alternating current (AC) or direct current (DC). AC power can be delivered at a variety of voltage levels and phase configurations (e.g. two-phase and three-phase). For large-scale industrial applications, electricity costs can be a considerable portion of the operating budget. Furthermore, in an IT application there can be many devices such as servers, storage devices, routers, and other communications and monitoring equipment placed together in racks. Data centers can house many rows of racks, and thus the power consumption of the data centers can be very high at times. Additionally, the power demand for both industrial applications and data centers can fluctuate based on various business factors such as time of day or season. Thus, managing power becomes an important aspect in many industrial applications, including data center administration. Even further, any energy savings achieved can translate into increased profits for an organization. Additionally, energy savings can provide additional dividends in terms of reduced wear and tear on power sources and reduced cooling costs, adding to an organization's received benefit.

In the case of data centers, also known as "server farms," there can be hundreds or even thousands of racks. The devices on the racks typically provide functionality including the storage, processing, and retrieval of data. Given the power requirements demanded by the rack-mounted devices, reliable and efficient power delivery is crucial for successful operation of the organizations using the data centers. In some cases, the reliability and availability requirements placed on the devices powering the data center infrastructure must meet or exceed predetermined statutory requirements, as is the case for financial institutions.

No matter the type of institution however, important issues such as availability, reliability, job load, and other organizational requirements of data centers, mean that various infrastructure requirements must be met. For example, the issue of effectively cooling a data center (i.e. the removal of excess heat) is a critical issue which must be addressed to ensure stable and reliable operation of the data center. Each of the many devices in the data center generates substantial amounts of heat, whether the device is a server, a blade, a switch, a backup unit, a communications unit, or another device. The cooling of modern data centers can directly impact the layout and design of the center. Another significant data center design consideration involves providing sufficient power to the data center. Particularly in the case of high-reliability data centers, such as those used for e-commerce, banking, airline reservations, video distribution, and the like, power can be provided by more than one power grid, while for other data centers, power can be provided by a combination of a power grid and locally generated power. Regardless of how the power is delivered to the data center, providing reliable and efficient power to the large number of computers and associated equipment in modern data centers or server farms is an important aspect of successful operation of such facilities.

SUMMARY

In the current data center ecosystem, energy management solutions primarily focus on monitoring the basic operations of devices, providing alerts and notifications, and, sometimes implementing controls that cap or limit the performance of the load (i.e. the power-consuming devices being supplied), thus reducing the power footprint of the data center as a whole. This capping or limiting is known as power throttling the load. However, under current power throttling implementations, the data center-supplying power systems continue to dissipate significant heat and evidence power losses at the source level in spite of reduced power consumption by the loads. Existing power systems lack supply-side management and control capabilities.

Disclosed embodiments provide energy control via power requirement analysis and power source enablement. Both demand-side and supply-side techniques can be used alone or in conjunction to determine an optimal number of power sources to supply power to one or more loads. On the demand side, some loads can be decoupled in order to continue delivering power to critical systems. On the supply side, power sources can be turned on or off as needed to meet the current power demands of a system. Power sources can be periodically deactivated by the system on a rotational basis such that all power sources wear evenly, prolonging the life of the equipment. Embodiments provide a horizontally scalable, modular architecture that allows the virtualization of power from the underlying hardware form-factor.

A processor-implemented method for power control is disclosed comprising: accessing a plurality of power sources which are coupled to one or more power loads, detecting power requirements for the one or more power loads, and enabling one or more power sources from the plurality of power sources to match the power requirements of the one or more power loads wherein the enabling is a function of demand-side requirements. The disclosed method provides for handling demand-side requirements which are dynamic power requirements of the one or more power loads. The enabling can be performed dynamically as a function of dynamic power requirements of the one or more power loads. In embodiments, power supply units are migrated for phase balancing and age balancing.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
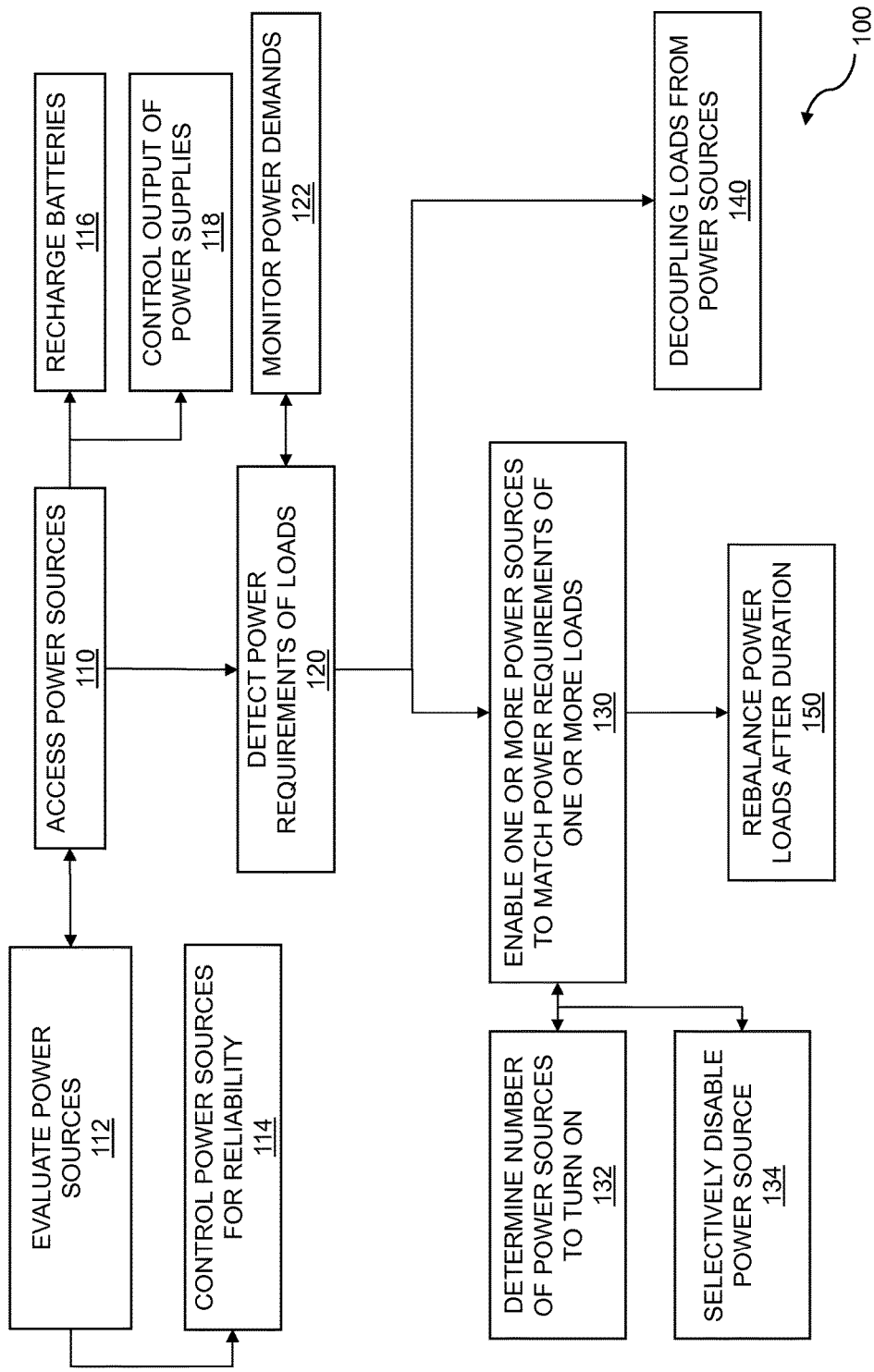
FIG. 1 is a flow diagram for power control.

Disclosed is a processor-implemented method for power control. In the current data center ecosystem, energy management solutions primarily focus on monitoring the basic operations of devices, providing alerts and notifications, and sometimes implementing controls that cap or limit the performance of the load (i.e. the power-consuming devices being supplied) thus reducing the power footprint of the data center as a whole. The capping or limiting is known as power throttling the load. However, under current power throttling implementations, the data center-supplying power systems continue to dissipate significant heat and experience power losses at the source level in spite of reduced power consumption on the load, because existing power systems lack supply side management and control capabilities.

With a large number of power supplies, dynamic control can be applied to the power mesh to enable real-time adjustments augmenting reliability. For example, when only 20% of the total power is needed, the power supplies with the greatest reliability can be enabled to meet the demand. The activated power supplies can be selected from the pool of available supplies based on information derived from monitoring of the reliability statuses and proximities to the load of each of the supplies. In such a network, the system reliability is a function of the turning the supplies on and off. Savings are realized in that both reliability—the amount of reliable power which is activated to meet demand—and hardware overhead costs are improved. Thus, by monitoring and adjusting reliability dynamically, the software-defined power module is able to significantly extend the time between repairs or replacement of power sources and associated equipment.

Power sources, including batteries, power supplies, and utility power can be allocated to IT equipment in a datacenter based on monitoring and analysis of dynamic power load requirements of the IT equipment. The various power sources can be allocated using criteria including the number of power sources required to meet the dynamic load requirements, power source capabilities, efficiency of the power sources (e.g. operating points), usage hours of a given power source, and balancing of the dynamic loads across power sources. The power drawn from a given power source can be allocated based on the type of power source. The power output of batteries can be set to determine utility power supply. For example, using output control for the power supplies sets the power output from power supplies. Further, utility AC power, including three-phase AC power, can be selected based on the number of power phases needed and on balancing the AC-power loads across the AC-power phases. In embodiments, the purpose of the allocation of the power sources is to maximize the operational efficiency of the various power sources and to reduce overall power usage.

The allocation of the dynamic power loads to the power sources can be thought of as elastic in that surplus power from a power source can be allocated to a power shortfall of a power load. Further, the amount of power allocated can increase and decrease based on demand in an effort to reduce overall power demand. For example, even in a medium-sized power supply setup, multiple power surpluses and power shortfalls occur constantly. The power surpluses and shortfalls can occur within an IT rack, within a node, within a data center, and across datacenters. The elasticity of the power allocation supports identifying the power surpluses and the power shortfalls, and allocating the power surpluses to the power shortfalls. The elastic power allocation can be used for orchestration and control purposes. The elastic power allocation can also be used to orchestrate third-party systems through power management on motherboards embedded in IT infrastructure, through service assurance applications, and through hypervisor and cluster management. The elastic power allocation can further be used to control central processing unit (CPU) nodes; virtual machines, containers, and process placements; disk drives and storage systems; and network nodes and systems.

In embodiments, the dynamic power source draw allocation, the elastic power allocation, and the orchestration and the control of third party systems are managed from a cloud-based application, system, and method. The cloud-based application can monitor the dynamic power load requirements of the various systems in the IT datacenter. The cloud-based application can further monitor the various power sources of the datacenter including batteries, power supplies, and utility power.

In embodiments, the cloud-based application identifies power surpluses and power shortfalls within nodes, racks, the datacenter, and across datacenters. The cloud-based application can allocate the power surpluses to the power shortfalls.

The technique by which the allocation of power sources to power loads is improved is based on prediction. The prediction technique can generate a model for allocating power sources and can be used to predict key parameters including the health, capacity, and failure rate of a given power source. The prediction can be used to predict various parameters related to a power supply including health of the supply, supply failure, supply lifetime remaining, supply demand, the economics of the supply including price and service cost, service level assurance, and supply capacity. The prediction can also be used to predict battery capacity and battery lifetime remaining. The prediction can be based on monitoring the efficacy of the dynamic power allocation technique. In the absence of a depth of allocation data, simulation and training can be used to form the prediction models. In embodiments, the simulation is used to explore behavior of the power sources under extreme allocation scenarios. Extreme allocation scenarios can include situations such as allocating a small number of power sources to provide the dynamic power needs of the power loads and scenarios where power sources are operated inefficiently. The simulation results can be used to train the prediction models in order to improve the prediction models. In embodiments, improving the prediction models includes avoiding overloading some power sources while underutilizing other power sources. The improvement of the prediction models can further include allocating the power sources in order to operate the power sources at maximum efficiency and to reduce failure rates of the power sources.

FIG. 1 is a flow diagram 100 for power control. The flow 100 includes accessing a plurality of power sources 110 which are coupled to one or more power loads. The power loads can include servers, storage devices, and communications devices, among others. The plurality of power sources 110 can include one or more batteries. The plurality of power sources 110 can deliver power to the one or more power loads across a common bus. The flow 100 includes detecting power requirements for the one or more power loads 120. In embodiments, the detecting of power requirements includes detecting maximum (peak) power requirements, average power requirements, and/or minimum power requirements for the loads.

The flow 100 includes enabling one or more power sources from the plurality of power sources to match the power requirements of the one or more power loads 130 wherein the enabling is a function of demand-side requirements. The demand-side requirements can be dynamic power requirements of the one or more power loads. In embodiments, the evaluation of demand-side requirements includes examination of the context and function of the one or more power loads. For example, in a data center environment there can be a variety of servers performing different functions. The many running functions can range from extremely critical systems operations to less time-sensitive auxiliary processes, and demand-side load requirement evaluation can be performed in view of the differing priorities. In embodiments, the demand-side requirements are controlled by altering the demand-side operation. For example, in a data center, a server performing a tape backup can be paused or shut down when power demand for e-commerce servers spikes.

Further, the enabling of power sources can be determined based on parameters learned by the system. For example, if a particular server typically has a busy period on Mondays between 8:00 am and 5:00 pm and less traffic at other times, then the dynamic power requirements can be determined based in part on the current time of day and whether the current time of day falls within the busy period for the server. Other parameters can also be learned by the system and used to aid in efficient power-source enabling. In embodiments, the enabling includes local enabling on a rack-by-rack basis. The local enabling can determine and activate power sources selectively within a rack. In some embodiments, the enabling includes global enabling that is facilitated via a central appliance that works across racks in a data center. The global enabling can work across a larger group of power sources and selectively activate groups of power sources on a region-by-region basis.

To further aid in dynamically managing power requirements, the flow 100 can comprise decoupling loads from the plurality of power sources 140. For example, in a situation where power demand is suddenly increased, one or more loads can be decoupled such that important functionality is maintained while less critical functions are deferred. For example, a server performing background monitoring tasks can be temporarily suspended to allow servers running more critical tasks (e.g. a video distribution system) to receive adequate power to continue executing the critical tasks.

The decoupling can be a function of the detecting of the power requirements. The detecting of power requirements can include querying servers and other equipment for current and/or maximum power requirements. In some embodiments, the querying includes retrieving data from MIBs (Management Information Bases) via SNMP (Simple Network Management Protocol). The power control module can then make a decision based on the known power requirements specifying that one or more loads need to be decoupled to allow power to be maintained on highly critical servers. Once the intelligent power control system is able to bring other sources of power online, loads that were previously decoupled can be reactivated such that the previous activity of those loads can be resumed.

The enabling can be performed dynamically as a function of dynamic power requirements of the one or more power loads. As previously mentioned, systems can learn new parameters for efficiently enabling power sources. In addition to learning that certain times of day can require additional power, (e.g. some servers are most busy during business hours) demand-side power requirements can be recorded to build up even more far-reaching historical data, and cyclical trends can be identified and used to predict future power demands over months and even years.

The flow 100 can further comprise evaluating reliability for the plurality of power sources 112 and controlling one or more power sources from the plurality of power sources to enhance reliability 114 of the plurality of power sources. In embodiments, this entails rotating the active power sources from a pool of available power sources. For example, in an N+2 redundancy configuration where N=6, there will be eight (6+2) total power supplies P1-P8 but only six need be active at any one time. The intelligent power control system can start supplying the required load with power sources P1-P6, while sources P7 and P8 remain idle. Then, after a predetermined period, power source P1 can be idled while power sources P2-P7 supply the required power for the loads. Next, power sources P3-P8 can be activated, and so on, such that each of the power sources goes through cycles of up and down time, thus ensuring the wear-leveling of the plurality of power sources.

The flow 100 can further comprise rebalancing the one or more power loads to the one or more power sources after a certain duration 150. For example, a rebalancing can be performed every 60 seconds. The rebalancing can entail reevaluating the power demands, enabling or disabling power sources as needed, and decoupling loads when required. The rebalancing can serve to ensure that the dynamic power provision is reflecting the most current system demands.

The flow 100 can further comprise selectively disabling a power source 134 from the plurality of power sources based on reduced need from the one or more power loads. For example, if a rebalancing is performed and entails reducing power, then one or more power sources can be decoupled or can have their output reduced. If the rebalancing instead entails supplying more power, then one or more power sources can be activated or can have their output increased. Additionally, if immediate power demands cannot be met by enabling power sources, one or more loads can be decoupled or operated in a reduced power mode. Putting a load into reduced power mode can include causing a server to enter a standby or sleep state. In other embodiments, the clock speed of a server is temporarily slowed to reduce power requirements.

The enabling can include determining a number of power sources to turn on 132. In embodiments, this entails determining how much additional power needs to be supplied, and then dividing the total required amount by the amount of power provided by each power source. For example, if 1000 watts of power are required and each power source can deliver 500 watts, then two power sources are turned on. Using a similar example, if 1200 watts of power are required and each power source can deliver 500 watts, then three power sources are turned on. Additionally, the required power load can be spread evenly across the three sources to improve wear and efficiency. For example, the three power sources in the situation above can be configured to each deliver 400 watts of power.

As another element in the system for dynamic power allocation, batteries can be used to supplement power delivery in critical situations. For example, batteries can be used to supplement a power source when there is a spike in demand. The batteries can continue to supply power until enough additional power sources are activated to meet the demand. Once the demand is met, the batteries can be decoupled from the power source output and put into a recharging state to be ready for a future demand spike. Thus, the flow 100 can further comprise recharging the one or more batteries 116 as part of the accessing.

The accessing can include controlling the output of the one or more power supplies 118. The output control can include, but is not limited to, control of output voltage, control of current limit, control of thermal limit, and control of cooling systems and sensors. The cooling systems can include, but are not limited to, fans, liquid cooling systems, and/or thermoelectric cooling systems. The sensors can include, but are not limited to, temperature sensors, fan speed sensors, current sensors, and voltage sensors. In embodiments, each of the plurality of sensors has the ability to evaluate voltage, current, or fan speed.

The enabling can provide for assigned redundancy tiering. A variety of redundancy configurations are possible. In some embodiments, an N+X redundancy configuration is used, where N is the number of power sources needed for normal operation and X is the number of power sources kept on premises in a standby state or in a configuration where the power sources can be readily brought online. For example, in an N+2 redundancy scheme, there are two extra power sources available for use in case of the failure of one of the other N power sources. In other embodiments, a 2N scheme is used, where there is a redundant power source for each operational power source. Thus in the 2N redundancy configuration, any critical path in the power system is replicated to remove single points of failure and increase robustness.

The enabling can be based on criteria including phase balancing, uniform power delivery, adaptive cooling, Mean Time Between Failures (MTBF) data, and manual control. The phase balancing can include changing the phase of a power source that is supplying one phase of a three-phase power supply system. Uniform power delivery can include maintaining a constant power level over time. Adaptive cooling can include controlling fans, liquid cooling systems, and/or thermoelectric cooling systems. As MTBF data is taken into account, embodiments include decoupling power sources based on MTBF data. That is, power supply units can be migrated for phase balancing and age balancing based on predicted time before failure for the units.

In embodiments, MTBF data is received via the Internet for various power source models. If a system has a particular power source model, then parameters such as time of continuous operation (operation since powered on), total operation time of the power source, and/or the number of times the power source has been cycled (powered on and off) is compared with the received MTBF data. If the power source model matches the model described in the MTBF data and the operational time is within a predetermined threshold of the MTBF data, the power source can be decoupled. An alert message and/or indication can be sent and/or logged to indicate that a power source has approached its MTBF time. In some embodiments, sub-data for a power source model can be used as criteria for determining if a power source should be decoupled due to approaching or reaching its MTBF time. The sub-data can include, but is not limited to, a serial number (or range of serial numbers), a manufacturing date (or range of manufacturing dates), and a MAC address of the power source. In this way, embodiments can proactively swap out a power source that is nearing its MTBF with a fresh power source that is not near its MTBF. Manual control can include decoupling power sources for purposes of maintaining uniform power delivery, to allow scheduled maintenance of power sources, and to ensure wear-leveling of power sources.

The plurality of power sources can be balanced based on cost, temperature, longevity, and MTBF. Thus, criteria such as the cost of a power source, the cost of operating a power source, the operating temperature of the power source, the continuous hours of operation logged by a power source, the number of times the power source has been cycled, and the amount of time until the expected MTBF is reached can be used in determining when a power source is coupled or decoupled from the power supply system.

Stress on each of the plurality of power supplies can be monitored. Power supplies can be selectively disabled based on the stress the supplies undergo. The stress can include one or more "health" indications that can be provided by the power source itself or from outside monitoring devices. Such health indications can include, but are not limited to, indications of fan health, battery health, DC voltage fluctuation, and operating temperature. Indications of fan health can include current fan speed, hours of fan operation, number of total rotations of the fan, and/or fluctuation in fan speed. In embodiments, the indication of battery health is based on measurements of voltage, fluctuation in voltage, and/or charging time. The health indications and other parameters can be used to derive a stress value, and the stress value can be used in such a way that when the stress value exceeds a predetermined threshold the power source is marked as "stressed." In embodiments, a stressed power source is a candidate for decoupling. However, depending on the demand-side conditions, a stressed power source might not be decoupled immediately. In some embodiments, a notification/warning message is sent and/or an event is logged in a log file to indicate that a stressed power source is in use. Once the demand falls below a predetermined threshold, the stressed power source can be given priority to be decoupled.

The flow 100 can further comprise monitoring power demands 122 from the one or more power loads on an ongoing basis. The monitoring can be performed at a server level, a rack level, a row level (a row of racks), or a room level (a room of racks). Additionally, logical groupings of racks, referred to herein as "cages," can be monitored for power demands. A cage can comprise one or more racks, but the physical proximity of the racks can have no bearing on the ways in which racks are grouped into cages. In embodiments, the cage comprises a plurality of racks belonging to a particular entity (e.g. a particular company). Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
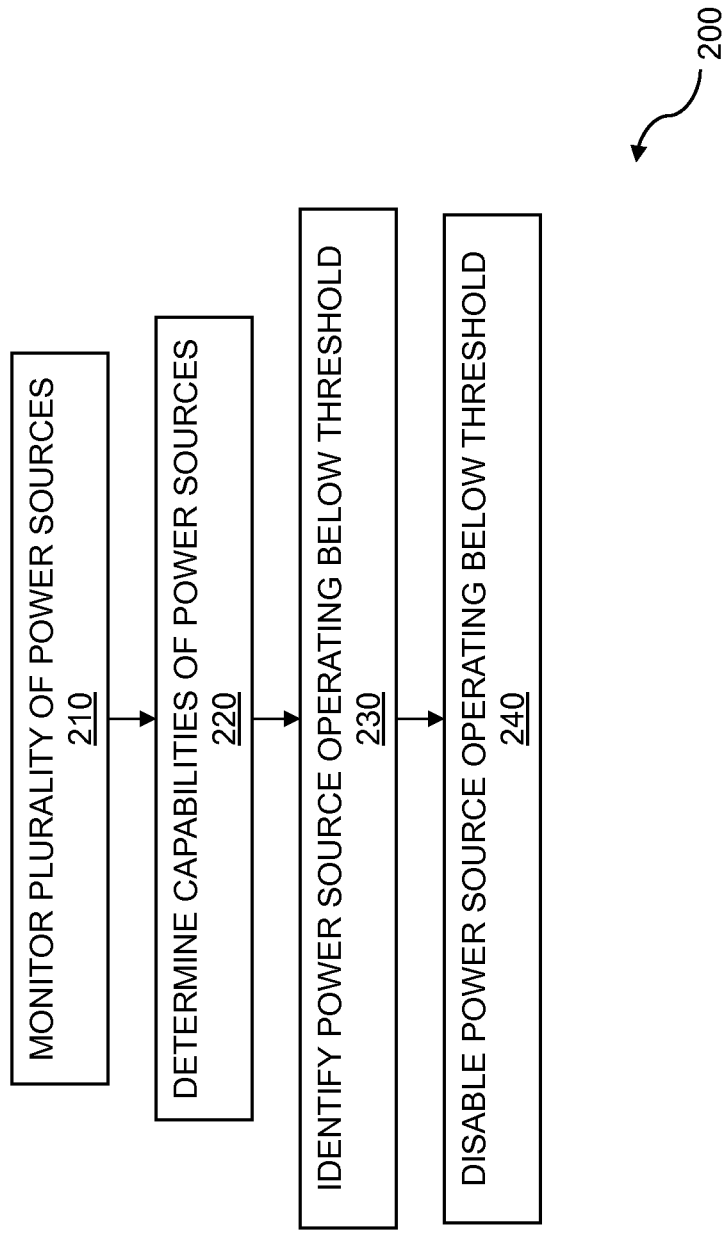
FIG. 2 is a flow diagram for power source usage.

FIG. 2 is a flow diagram 200 for power source usage. The flow 200 can comprise monitoring a plurality of power sources 210 with a plurality of sensors. The sensors can include, but are not limited to, voltage sensors, current sensors, temperature sensors, humidity sensors, fan speed sensors, and battery health sensors. The flow can comprise determining capabilities for each of a plurality of power sources 220. The determining of capabilities can include determining if the power source is capable of providing intelligent power control or if the power source is a legacy power source with minimal to nonexistent power control capabilities. The determining of capabilities can include reading MIBs via SNMP or querying registers in the power sources via a remote connection, such as via TCP/IP over Ethernet, for example. The flow 200 can include identifying, based on sensor data from the plurality of power sources, a power source that is operating below a quality threshold 230. The sensors providing the data can include, but are not limited to, voltage sensors, current sensors, operating temperature sensors, and/or fan speed sensors. Additionally, parameters such as hours of continuous operation, hours of total operation, number of times the power source has been cycled, and/or MTBF data for the particular model of power source can be used in determining a quality value for a given power source. In embodiments, a quality value Q can be defined as:

$$Q=K1(C)+K2(T)+K3(P) \text{ where:}$$

K1, K2, and K3 are constants, C is the current amount of up-time (e.g. in minutes), T is the total operational time (e.g. in minutes), and P is the current operating temperature of the power source. The constants can be signed such that a lower value for Q indicates a lower quality. The flow 200 can further comprise disabling a power source that is operating below the quality threshold 240. In embodiments, the flow can include obtaining a group of profiles for the plurality of power sources; discovering information about a power source, from the plurality of power sources, using a plurality of sensors; calculating a power source profile based on the information that was discovered; comparing the power source profile with the group of profiles; and classifying the power source based on the comparing. In some cases, the power source does not provide information about its identity. Such a case can occur when smart features for a power source fail. In some embodiments, the flow can include augmenting smart information provided by the power source with the power source profile that was calculated. Furthermore, the flow can include obtaining data from the plurality of power sources; classifying a subset of the plurality of power sources; modeling behavior for the subset of the plurality of power sources; and analyzing failure for the subset of the plurality of power sources based on the modeling. The modeling may provide a rule based predictive model. The analyzing failure can include predicting a failure. Various steps in the flow 200 may be changed in order, repeated, omitted, or the like without departing from the disclosed concepts. Various embodiments of the flow 200 may be included in a computer program product embodied in a non-transitory computer readable medium that includes code executable by one or more processors.

Figure 3:
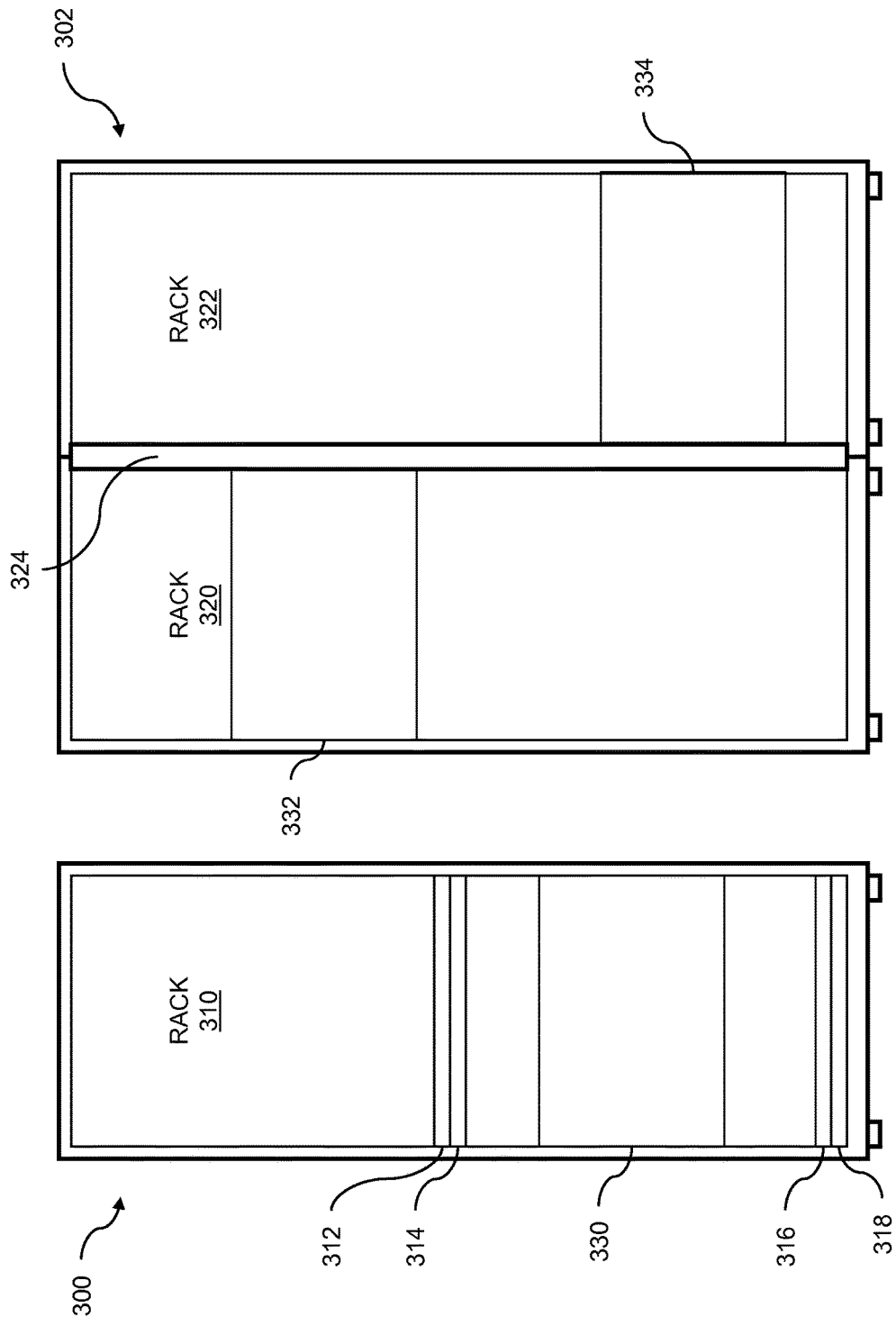
FIG. 3 shows example rack and power configurations.

FIG. 3 shows two example rack and power configurations, a first configuration 300 and a second configuration 302. The one or more batteries, the one or more power supplies, the plurality of connectors, the plurality of power sensors, the plurality of load sensors, and the controllers can comprise a consolidated rack mount power system. Such a system is shown in the first configuration 300 which includes a rack 310, further composed of consolidated rack mount power systems 312, 314, 316, and 318.

The enabling of one or more power sources can provide power for a data center rack. The rack 310 includes rack-mounted equipment 330, which can comprise, but is not limited to, servers, storage devices, routers, and/or switches. The one or more batteries, the one or more power supplies, the plurality of connectors, the plurality of power sensors, the plurality of load sensors, and the controllers can together form a consolidated side mount power system. An example of a consolidated side mount power system is shown in configuration 302 which includes a first rack 320 and a second rack 322 with the consolidated side mount power system 324 placed between the first rack 320 and the second rack 322. The first rack 320 includes rack-mounted equipment 332, which can comprise, but is not limited to, servers, storage devices, routers, and/or switches. Similarly, the second rack 322 also includes rack-mounted equipment 334, which can also comprise, but is also not limited to, servers, storage devices, routers, and/or switches. Two or more consolidated side mount power systems can be stackable. In the example shown, consolidated rack mount power systems 312 and 314 are stacked on one another in adjacent rack spaces.

The detecting power requirements can be accomplished across racks. For example, the second example configuration 302 allows for the detection of power requirements for the both the first rack 320 and the second rack 322. As mentioned previously, a group of racks serving a particular entity or performing a specific function can be referred to as a cage, with the racks in a cage not necessarily in physical proximity to one another. In embodiments, the detecting power requirements can be accomplished on a cage basis. Even further, the detecting can include detection across multiple racks, across cages, across geography, across topology, or across hardware architectures. For example, the detecting can include detection across multiple geographically separated data centers. The detection across topology can include detection on various server platforms (blade servers, rack mounted servers, Linux® servers, Windows™ servers, etc.). Additionally, the detection can span a variety of hardware architectures (e.g. ARM, MIPS, and multiple core systems).

Figure 4:
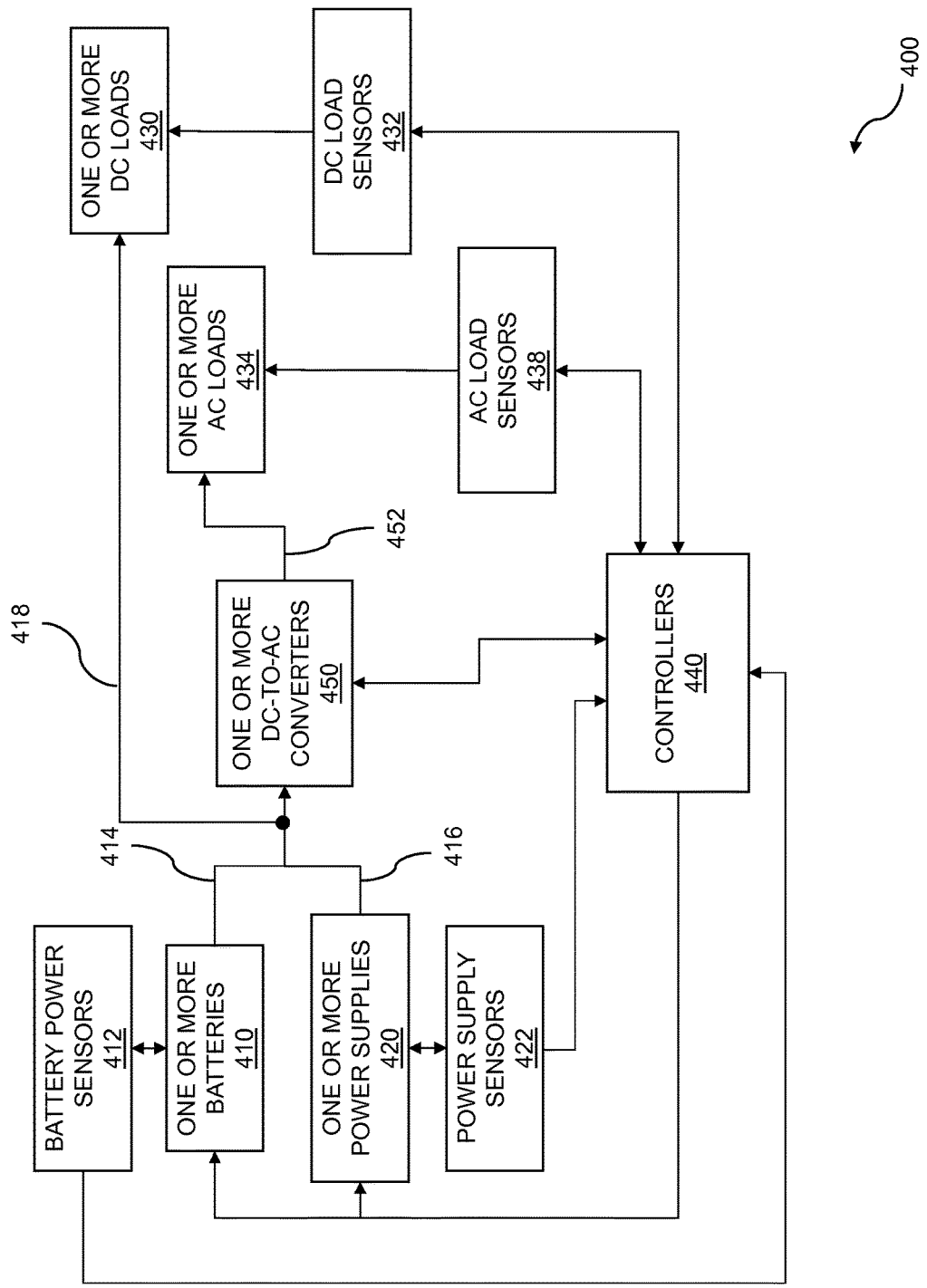
FIG. 4 is a diagram of power supplies and sensors.

FIG. 4 is a diagram 400 of power supplies and sensors. The system 400 manages supplied power using load-side power requirement analysis and power source enablement. The system depicted in the diagram 400 includes one or more batteries 410. The one or more batteries 410 can include, but are not limited to, lead-acid batteries, gel-cells, lithium-ion batteries, nickel-cadmium batteries, nickel metal-hydride batteries, or other suitable technology. In some embodiments, the batteries 410 are smart batteries that include capabilities such as an internal voltage monitoring circuit. In embodiments, the plurality of power sources can include one or more power supplies 420. The one or more power supplies can be smart power supplies, and can include a capability of reporting parameters such as, but not limited to, output voltage, output current, operating temperature, and duration of operation. In the system depicted in diagram 400, a plurality of battery power sensors 412 are coupled to the one or more batteries 410 and a plurality of power supply sensors 422 are coupled to the one or more power supplies 420. The system depicted in diagram 400 also includes a plurality of connectors such as a connector 414 and another connector 416 to provide coupling between the one or more batteries 410 and the one or more power supplies 420. The connector 414 and the other connector 416 further provide power to one or more DC loads 430 through a third connector 418. Similarly, the connector 414 and the other connector 416 can provide power to one or more DC-to-AC converters 450. The system 400 shown includes a connector such as connector 452, which in embodiments provides power to one or more AC loads 434 from the one or more DC-to-AC converters 450. In embodiments, the one or more batteries 410 and the one or more power supplies 420 provide power to the one or more DC loads 430. In some embodiments, one or more DC-to-AC converters 450 provide power to the one or more AC loads 434. In some embodiments, a plurality of DC-to-AC converters is configured to provide three-phase AC power. The DC loads 430 can include rack-mounted servers, storage arrays, network interfaces, monitoring equipment, and cooling systems, for example. The AC loads can include legacy equipment including servers, rack-mounted servers, storage arrays, network interfaces, and so on, all of which operate on AC voltages—208-volts AC (VAC), for example. The system depicted in diagram 400 includes a plurality of DC load sensors 432 coupled to the one or more DC loads 430 and a plurality of AC load sensors 438 coupled to the one or more AC loads 434. The DC load sensors 432 are configured to provide instantaneous current requirements of the one or more DC loads 430. The AC load sensors 438 are configured to provide instantaneous current requirements of the one or more AC loads 434. The DC loads 430 and the AC loads 432 can include rack-mounted servers, storage arrays, network interfaces, monitoring equipment, and cooling systems, for example. In embodiments, one or more of the plurality of DC sensors 432 and one or more of the plurality of AC sensors 438 have the ability to be hot plugged. That is, the DC sensors and the AC sensors can be connected to the system while the system is in a powered-on state. In embodiments, one or more of the plurality of sensors is dynamically coupled to the one or more power sources or the one or more power loads.

The system depicted in diagram 400 includes one or more controllers 440 which control the one or more batteries 410, the one or more power supplies 420, and the one or more DC-to-AC converters 450, and where the controllers respond to the plurality of power sensors such as the battery power sensors 412, the power supply sensors 422, the plurality of DC load sensors 432, and the plurality of AC load sensors 438. The controllers 440 enable the one or more batteries 410, the one or more power supplies 420, and the one or more DC-to-AC converters 450 to provide adequate power to the one or more DC loads 430 and the one or more AC loads 134 respectively. The enabling can optimize the one or more power sources so that the one or more power sources operate in an efficient power range. Some power sources have a peak efficiency within a predetermined power output range. For example, a power source with a maximum output of 500 W might have a maximum efficiency when outputting between 350 W and 400 W. Hence, the controllers 440 can help ensure that power sources operate in the peak efficiency window for the given power source (for example, 350 W to 400 W for the 500 W power source just mentioned). In embodiments, the enabling by the controllers 440 provides for supply-side power management. Thus, in some embodiments, the enabling is accomplished without coordination with the one or more DC power loads 430 and the one or more AC power loads 434. Additionally, the one or more batteries 410 are configured to handle increased power demands of the one or more DC-to-AC converters due to spikes in the power demands of the AC loads. The one or more power supplies 420 can provide a substantially 12-volt DC power but numerous other voltages, either DC or AC, can be provided without departing from the disclosed concepts. In embodiments, the one or more power supplies 420 are used to provide a substantially 48-volt DC power or other required DC power. For example, a DC-to-DC converter can produce the substantially 48-volt DC power from the substantially 12-volt DC power of the one or more power supplies. In other embodiments, the one or more power supplies 420 can provide other appropriate DC voltages. The one or more DC-to-AC converters 450 can provide an AC voltage appropriate to the one or more AC loads. The presence of AC loads can be due to legacy equipment, for example. The one or more DC-to-AC converters 450 can provide the same AC voltages or can provide different AC voltages as needed by the one or more AC loads. The one or more DC-to-AC converters 450 can provide a substantially 208-volt AC power.

The controllers 440 can contain one or more processors or microcontrollers, input/output (IO) functions, network interfaces, and user interfaces that can include front panel buttons, liquid crystal display (LCD) screens, and/or other suitable user interface mechanisms. The controllers 440 can calculate a number of power supplies and DC-to-AC converters necessary. The calculation of necessary power supplies and DC-to-AC converters can be (performed by querying the DC load sensors 432 and the AC load sensors 438 to determine the DC and AC power requirements. The controllers 440 can query the one or more power supplies 420 to determine the capabilities of each power supply and thus calculate a number of power supplies necessary for a given DC load requirement. The controllers 440 can query the one or more DC-to-AC converters 450 to determine the capabilities of each DC-to-AC converter, and are able to calculate the number of DC-to-AC converters necessary for a given AC load requirement in some embodiments. The controllers 440 can include a microcontroller capable of sensing voltage and current and controlling the power supplies, batteries, and DC-to-AC converters. Embedded software running on the microcontroller can be developed specifically to run the power supplies in such a way as to maximize the time spent by each power supply in the most efficient part of its energy efficiency curves, thus ensuring optimal or near optimal usage. For example, in a scenario where a rack includes multiple currently-idle servers, the power requirements for the rack might be 12V with a current draw of 2.1 amperes. If a query arrives for the servers to process, multiple previously idle processor cores within the server can start to consume more power in response to the query. As a result, the current draw might suddenly increase to 2.9 amperes. Thus the power supplies can prove unable to meet the power demand of the load for a given duration, with the duration defined as a function of dynamic power requirements. The duration wherein the one or more power supplies do not provide sufficient power can be a time duration during which the controllers trigger the one or more power supplies to provide more power.

In the example 400 shown, the controllers 440 are coupled to the DC load sensors 432 and the AC load sensors 438 and detect the increased power demand. The detecting can include detection of the dynamic demand-side power requirements. The demand-side requirements can be dynamic power requirements of the one or more DC power loads 430 and one or more of the AC power loads 434. The detecting of the power requirements can be performed by a plurality of sensors where the sensors can include, but are not limited to, temperature sensors, humidity sensors, fan speed sensors, current sensors, and voltage sensors.

The controllers 440 can utilize switches and/or relays to switch on one or more batteries 410 in order to maintain the 12-volt output and supply the needed current. In embodiments, the relays include Double Pole Double Throw (DPDT) relays. The controllers 440 then can communicate with the one or more power supplies 420 to increase output of the power supplies 420 and/or to bring additional power supplies 420 online to meet the increased DC power demand. Once the additional power supplies 420 can supply the needed power, the batteries 410 are no longer needed to supply additional power and can be switched out of the circuit and/or placed into a recharging mode to be ready for the next increase in demand. In embodiments, the battery operation can be enabled or disabled using a microcontroller within the controllers 440. Similarly, the controllers 440 can communicate with the one or more DC-to-AC converters 450 to increase output of the DC-to-AC converters 450 (i.e. increase current) and/or to bring additional DC-to-AC converters 450 online to meet the increased power demand. In embodiments, multiple batteries are pooled and connected in parallel to provide required power at the output.

The controllers 440 can be configured to directly couple the power source to the DC load 430 in the event of a failure in a controller. In embodiments, a hardware failsafe system is used in order to ensure that if a controller 440 fails, the power supplies 420 and the DC-to-AC converters 450 remain on and continuously provide power to the one or more DC loads 430 and to the one or more AC loads 434 respectively. In embodiments, the hardware failsafe system includes one or more relays that are coupled to one or more signals provided by the one or more controllers 440. In the event of a controller failure, the absence of the check-in signal triggers an operation by which the relays provide a direct path for power from the power supplies 420 to the one or more DC loads 430 and from the DC-to-AC converters 450 to the one or more AC loads 434 in order to render the reliability of the power to the loads functionally independent of the reliability of the one or more controllers 440. In embodiments, multiple batteries are pooled and connected in parallel to provide required power at the output.

Upon failure of a controller 440, control of the one or more batteries 410, the one or more power supplies 420, and the one or more DC-to-AC converters 450 can be transferred to a second controller. In embodiments, a periodic handshake, or heartbeat mechanism, is employed such that each controller is aware of the status of other controllers. For example, in a scenario with two controllers 440 where each controller is responsible for controlling two power supplies, the first controller and second controller periodically initiate a handshake sequence where the first controller sends a message to the second controller and awaits an acknowledgement from the second controller. Similarly, the second controller sends a message to the first controller and awaits an acknowledgement from the first controller. If the second controller sends a message to the first controller but the first controller does not acknowledge receipt, a failure of the first controller can be determined. For example, after a predetermined time-out period (e.g. 200 milliseconds), the second controller can divert control of the first controller's power supplies to the second controller. In this way, distribution of power continues to be controlled by the second controller until the first controller can be repaired or replaced. Thus, the one or more controllers 440 can comprise a plurality of controllers and the plurality of controllers can provide for redundancy of operation within the plurality of controllers so that the one or more batteries 410 and the one or more power supplies 420 continue to provide adequate power to the one or more DC loads 430, and the one or more DC-to-AC converters 450 continue to provide adequate AC power to the one or more AC loads 434.

The controllers 440 can be configured to enter a default mode upon startup. In embodiments, the default mode places all power supplies 420 in an ON configuration. The one or more power supplies 420 can initialize to a 12-volt DC setting upon initial connection. In other embodiments, the default mode places all DC-to-AC converters 450 in an ON configuration. The one or more DC-to-AC converters 450 can initialize to a 208-volt AC setting upon initial connection. Once the controllers 440 assess current load requirements via the DC load sensors 432 and the AC load sensors 438, the controllers can allow one or more of the power supplies 420 and one or more of the DC-to-AC converters 450 to be switched off or have their output reduced in order to save energy. In addition to energy savings, the reduced operating temperature inherent in a standby or deactivated power supply can result in heat savings as well. As a typical data center or server farm must have an extensive cooling system to maintain an optimal operating temperature for the equipment, additional energy savings accompany the heat savings because the cooling system does not have to operate at as high a level in order to achieve the desired ambient temperature when the power supplies 420 operated by the controllers 440 are functioning with lower heat output. The controllers 440 can be housed separately from the one or more batteries 410, the one or more power supplies 420, and the one or more DC-to-AC converters 450. In embodiments, the one or more batteries 410, the one or more power supplies 420, the one or more DC-to-AC converters 450, the plurality of connectors 414, 416, 418, and 452, the plurality of power sensors 412 and 422, the plurality of DC load sensors 432 and AC load sensors 438, and the controllers 440 can be housed in a 1 U (one rack unit) enclosure and mounted in a rack. The one or more batteries 410, the one or more power supplies 420, the one or more DC-to-AC converters 450, the plurality of connectors 414, 416, 418, and 452, the plurality of power sensors 412 and 422, the plurality of DC load sensors 432 and AC load sensors 438, and the controllers 440 can provide power for a data center rack (e.g. rack 310 of FIG. 3).

The apparatus 400 can further include a module that determines the capabilities of the one or more power supplies 420 and the one or more DC-to-AC converters 450. In embodiments, the one or more controllers 440 utilize a communications protocol such as SCPI, IEEE-488 (GPIB), or another suitable protocol. The commands can include interrogating the power supplies 420 and the DC-to-AC converters 450 for maximum voltage and current capabilities, cycle rate, total kilowatt hours provided, maximum operational duration, time in service (how long the power supply or the DC-to-AC converter has been operating since it came online), ambient temperature requirements, battery conditions, and other various parameters. The apparatus 400 can further comprise network connectivity for one or more of the one or more power supplies 420, the one or more DC-to-AC converters 450, the plurality of power sensors 412, the plurality of DC load sensors 432 and AC load sensors, and/or the controllers 440.

The apparatus 400 can further comprise a module that determines power requirements for the DC loads 430 and the AC loads 434. Power requirements of the power loads operating at a given time can be detected. Based on the detecting of the load power requirements, one or more power supplies and one or more DC-to-AC converters 450 can be enabled to match the power requirements of the one or more DC loads 430 and the one or more AC loads 434, respectively. In embodiments, the power requirements are detected by querying one or more of the power supplies 420 and the one or more DC-to-AC converters to retrieve the output voltage and current parameters.

The controllers 440 can perform a detection, using the plurality of power supply sensors 422, which determines that certain of the one or more power supplies 420 and certain of the one or more DC-to-AC converters 450 are not controllable by the controller 440. Attempting to query the power supply or the DC-to-AC converter can trigger the performance of this detection. The querying can occur, for example, in a scenario where an older power supply is swapped in for a smart power supply on a temporary basis to allow delivery of power while the smart power supply is repaired. In such a scenario, it might be preferable to use an unreachable power supply (one that is not controllable by the controller) on a temporary basis until the unreachable power supply can be replaced with a smart power supply.

The controllers 440 can invoke a failure policy based on the detection. Example failure policies include sending a diagnostics message to another monitoring system and/or data center personnel and shutting down the load that is connected to the unreachable power supply or the unreachable DC-to-AC converter. The controllers 440 can perform a detection, using the plurality of battery power sensors 412, which determines that certain batteries of the one or more batteries 410 are at a low voltage. In some embodiments, the batteries 410 have integrated voltage sensors. Batteries that quickly revert to a low voltage condition after being charged can trigger a signal flagging the batteries for replacement. In response to the detection, a diagnostics message can be sent to another monitoring system and/or data center personnel to indicate that one or more batteries need replacement. In embodiments, the controllers 440 are further configured to detect a faulty battery charger.

The controllers 440 can evaluate possible power capabilities of the one or more power supplies 420 and the power requirements of the load, determine that the power requirements of the load exceed the power capabilities of the one or more power supplies, and couple the one or more batteries to the load to supply additionally needed power. Connecting one or more batteries to the loads and selecting additional power supplies for connection to the loads can provide a way to meet dynamic spikes in load power requirements. For example, after batteries cover immediate spikes in system demand, additional power supplies are enabled to the loads and the batteries providing the power for spikes in demand are disabled from the loads. When the power demand of the loads is reduced, one or more power supplies are disabled from the loads. The load or loads can include a plurality of sub loads. In embodiments, the sub loads include cards within a rack or other peripherals connected to a rack-mounted piece of equipment. In embodiments, a flow for power control can include determining power requirements for a plurality of data center racks, wherein the plurality of data center racks comprise the one or more power loads; evaluating power capabilities of the plurality of power sources coupled to the plurality of data center racks; calculating stranded power capacity from the plurality of power sources; and provisioning the plurality of power sources to provide power to the plurality of data center racks based on the stranded power capacity that was calculated. The flow can further include negotiating with other power capabilities from other power sources to utilize stranded capacity in the other power sources. Additionally, the flow can include optimizing supply-side power delivery from the plurality of power sources based on the stranded power capacity that was calculated. In some cases, optimizing can be performed for load-side power usage by the plurality of data center racks based on the stranded power capacity that was calculated. In some embodiments, the flow includes determining a priority order within the plurality of data center racks, using the priority order as part of the provisioning, capping power to a subset of the plurality of data center racks based on the priority order where the capping includes dynamic power capping for a lower priority subset of the plurality of data center racks.

Figure 5:
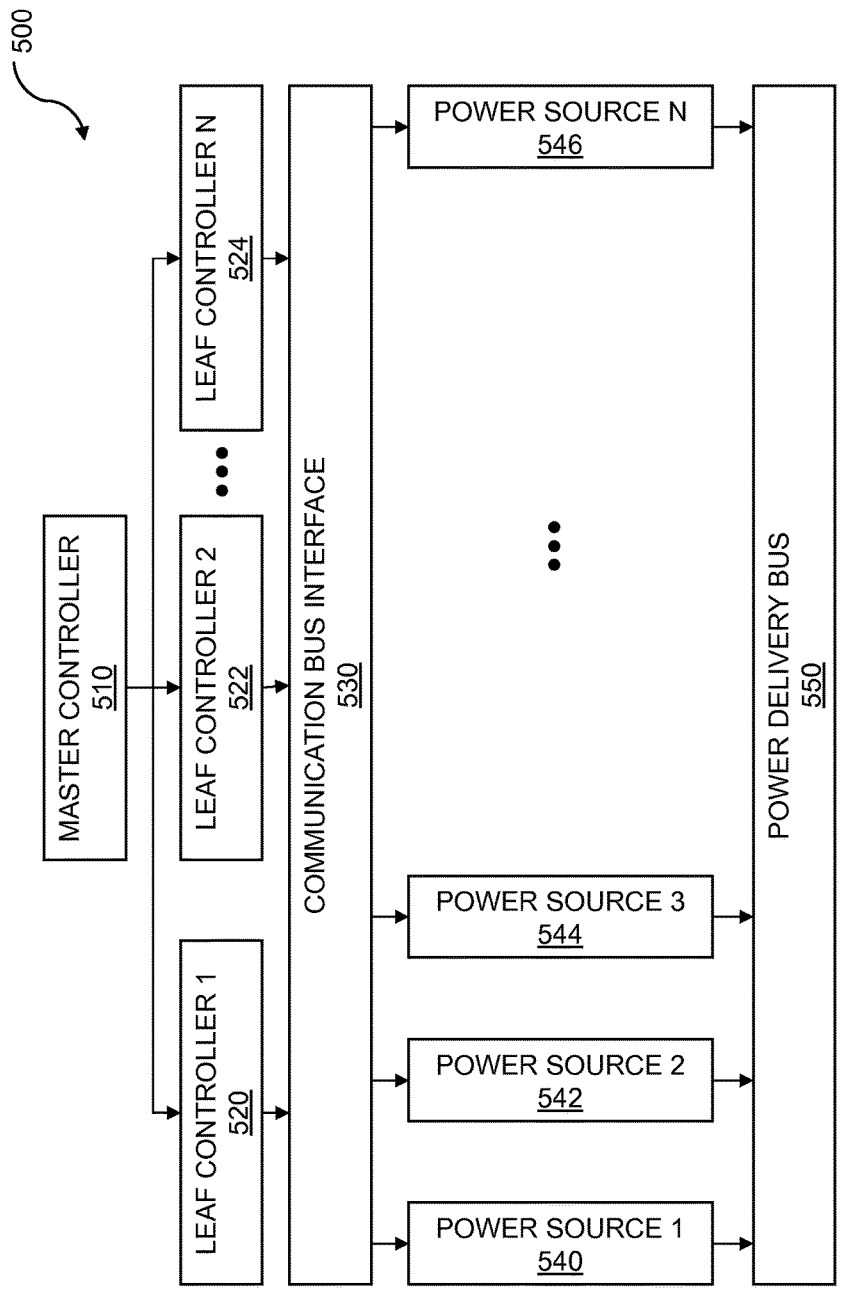
FIG. 5 is a diagram of controllers and power sources.

FIG. 5 is a diagram 500 of controllers and power sources. The controllers can include a master controller 510, and a plurality of leaf controllers. In the diagram 500 shown, a plurality of leaf controllers (a first 520 and second 522 through an N leaf controller 524) communicate with a master controller 510 and a communication bus 530. In embodiments, the communication bus interface 530 comprises a VME bus, an IEEE-488 bus, or another suitable architecture. The enabling can involve one or more master controllers 510 and a plurality of leaf controllers. The leaf controllers can be configured to control a plurality of power sources (indicated as power sources 1 540, 2 542, 3 544, and N 546 in the example given). The power sources are configured to deliver power via a power delivery bus 550. While the embodiment shown in FIG. 5 uses one level of leaf controllers, other embodiments use multiple levels of leaf controllers. For example, leaf controller 1 520 can communicate with a plurality of sub-leaf controllers (not shown). Each leaf controller can control a subset of the total pool of power sources. For example, a first leaf controller 520 can control three power sources while a second leaf controller 522 can control three other power sources, and so on. In embodiments, statuses and other operating parameters are collected from each power source by a corresponding leaf controller. Each leaf controller can then forward the data to the master controller 510. Additionally, the master controller 510 can monitor the health and status of each leaf controller. The master controller 510 can periodically send a message to each leaf controller and await a response. If the response does not arrive, the master controller 510 can then perform a failover process. In embodiments, the failover process includes the master controller assuming the duties of the failed leaf controller.

In embodiments, the leaf controllers manage the power systems directly—monitoring the current, voltage, temperature, fan, and other sensors in real-time; tracking any changes to the sensor data; and reporting detected changes to the master controller. In addition, the leaf controllers can apply the control actions as directed by the master controller. The master controller orchestrates the power-matching policy by continuously analyzing the total power requirements in the power delivery bus and ensuring there is enough reserve capacity to handle sudden power spikes.

Laid out below is an example algorithm for power matching. The algorithm assumes the pre-defined system scope as defined by the user—e.g. an individual or set of power apparatus. The power-matching algorithm has 2 key steps:
1. Determining the number of power systems on which to perform appropriate policy actions—i.e. how many power systems need to be turned on or off based on the real-time load. This determination also incorporates the assigned redundancy tiering (N, N+1, N+2, 2N). Further details of this determination are explained below. The tiering specifies how many extra power supplies to keep ON as standby reserves—that is, supplies not necessary for the core power-matching algorithm.
2. Selecting criteria for the nodes for power matching. The selection criteria of power systems on which to apply the power policy (on or off) is based on the following cost optimization functions—i.e. goals:
   a. Phase Balancing: implemented to keep the three assigned AC phases for each power system balanced. This can impact the overall cost and reliability of the power infrastructure.
   b. Uniform Power Delivery: implemented to intelligently select the power systems for implementation according to their power delivery KWH so that overall power usage is spread evenly across all available systems. This can minimize over-stressing power systems.
   c. Adaptive Cooling: implemented to optimize and maintain the ambient temperature of the power apparatus by monitoring and controlling the temperature of the power system as a whole.
   d. Maximize Life: implemented to optimize the overall MTBF of power systems and minimize wear and tear by keeping power systems in the optimal efficiency levels while avoiding frequent state changes.
   e. Manual Control: implemented to provide control, through APIs, to external entities for optimizing the cost function.

The following algorithm describes the determination for the number of nodes (power sources) for power-matching for an N-redundancy setup as described in some embodiments herein:

Variables:
   Tc=Total power in the bus bar, as calculated by the sum of output Voltage*Current (V*I) in the system metadata table
   Tnew=New total power as calculated by adding all of the V*I values reported by the worker nodes
   Pth=Power Supply Efficiency Level
   Na=Number of active power supplies (defined by the policy)
   Np=Number of parked power supplies (defined by the policy)
   Non=Number of power supplies currently on (<Na most of the times)
   Naction=Number of power supplies to take right-sizing action, >0 implies the turn ON action, <0 implies turn OFF
   Ti=Redundancy Tiering: 0=N, 1=N+1, 2=N+2

Figure 6:
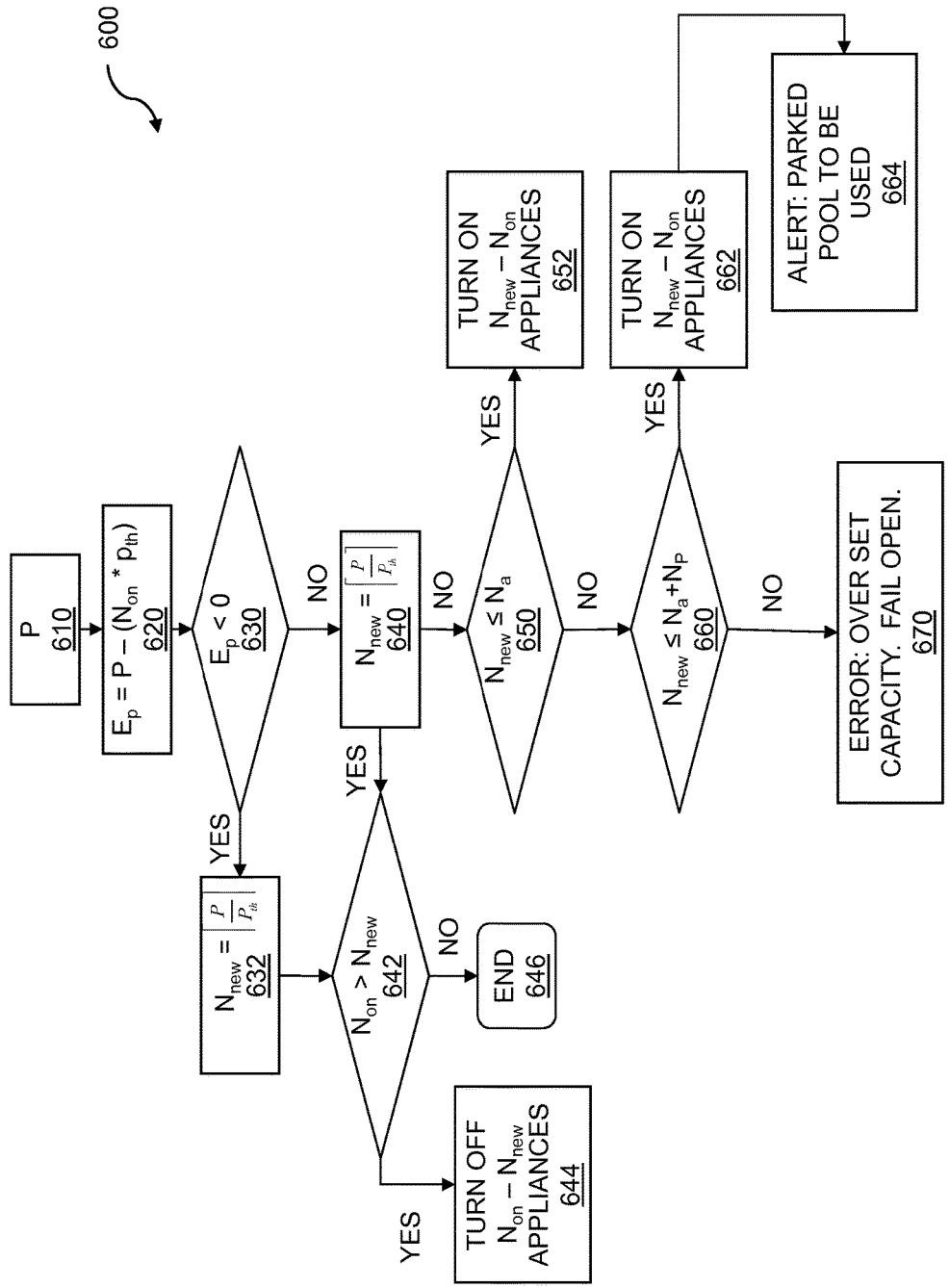
FIG. 6 is a flow diagram for power source enablement.

Algorithm:

1. Calculate change in total power dT = Tnew − Tc
2. If dT > 0:
   a) Calculate remaining threshold Rth = (Non * Pth) − Tc
   b) Calculate extra power needed to supply
      i. If (Rth > dT), then Ep = 0.
      ii. ELSE Ep = dT − Rth
   c) Calculate number of new power supplies to turn on or off Naction = Ceiling (Ep / Pth)
   d) Adjust for reliability tiering: Naction = Naction + Ti
   e) If (Non + Naction) <= Na, Turn ON Naction power supplies.
   f) ELSE if (Non + Naction) <= (Na + Np), then send alert to host that parked pool of supplies being used, AND turn on Naction power supplies
   g) If (Non + Naction) > (Na + Np) send ERROR message
3. If dT <0:
   a) Calculate # of PSUs needed Nnew = Ceiling (Tnew / Pth)
   b) If Non > Nnew,
      i. Naction = Nnew−Non
      ii. Adjust for reliability: Naction = Naction+Ti
      iii. Turn OFF Naction power supplies
   c) Non = Nnew
4. Return Naction FIG. 6 is a flow diagram 600 for power source enablement. The following variables are established for the description of flow diagram 600:

P—Total power demand from the system, where Power equals:

$$\sum_{i=0}^{Non} Vi * Ii$$

And:
   $p_{th}$—Threshold of a power supply
   Na—Number of active power supplies
   Np—Number of parked (passive, standby) power supplies
   Non—Number of power supplies currently on (will have a value less than Na most of the time)

In embodiments, the flow 600 comprises obtaining a total power demand P from the system 610. The flow continues with determining an energy factor Ep 620 as a function of the total power demand minus the amount of power currently being supplied by the active power sources (supplies). The flow 600 continues with determining if the energy factor Ep is less than zero 630. If yes, the flow continues to compute a new number of power sources (supplies) needed 632. In embodiments, the calculation is performed as a ceiling function of total power demand divided by power output per source (supply). The flow continues with comparing the new number of power sources computed in step 632 to the number of power sources currently active 642. If the number of currently active power sources is greater than the value computed in step 632, then one or more appliances (power sources) are turned off (decoupled) 644, the number of which is computed by Non-Nnew. If the number of currently active power sources is not greater than the value computed in step 632, then the flow ends 646.

If at the step to determine the energy factor 630 the energy factor Ep is greater than or equal to zero, then the flow continues to compute a new number of power sources (supplies) needed 640. In embodiments, the computation is performed as a ceiling function of total power demand divided by power output per source (supply). The flow then continues by determining if Nnew is less than or equal to the number of active power supplies Na 650. If YES, the flow continues and one or more appliances (active power supplies) are turned on to increase the overall power being supplied 652. If the determining 650 evaluates to NO, then the flow continues by determining if Nnew is less than or equal to the number of active power sources (Na) plus the number of parked power sources (Np) 660. A parked power source can be offline or in a standby state. If the evaluation 660 returns a YES, then additional appliances (power sources) are turned on 622, and the flow continues by generating an alert to indicate that one or more parked power sources were activated in order to meet the current power demands 664. In embodiments, the alert takes the form of an e-mail message, a text message, an automated telephone call, an audible alert signal, or another form of notification. Additionally, an event indicating the number of parked power sources that were activated and the time/date of the activation can be logged in a log file. Certain embodiments utilize the log of events to build historical data to predict future spikes in power demand. If the determining 660 evaluates to NO, then the flow continues by entering an error state 670 indicating that the capacity of the system is exceeded. In embodiments, entering the error condition also generates an alert that can take the form of an e-mail message, a text message, an automated telephone call, an audible alert signal, or another form of notification. Additionally, an event can be logged in a log file indicating the error condition. In some embodiments, loads can be decoupled from the plurality of power sources. The decoupling can be a function of the detecting of the power requirements. The determining of capabilities can include reading MIBs via SNMP or querying registers in the power sources via a remote connection, such as via TCP/IP over Ethernet, for example.

In some embodiments, the flow reverts back to obtaining a power demand for the system 610 upon entering an error state 670 and repeats the process but using a different value for $p_{th}$. In some embodiments, the first iteration uses a peak efficiency value for $p_{th}$ while the second iteration uses a maximum output value for $p_{th}$. For example, consider a plurality of power sources with a peak efficiency output of 400 W and a maximum output of 600 W. In the first iteration of the example embodiment, the algorithm attempts to meet the power requirements by keeping each power supply operating at peak efficiency. If it turns out that there is not sufficient power available in peak efficiency mode, the algorithm repeats the process using maximum output mode in an attempt to supply the needed power. Only in a case where the maximum output mode cannot meet the demand does the flow terminate in the error state 670.

Figure 7:
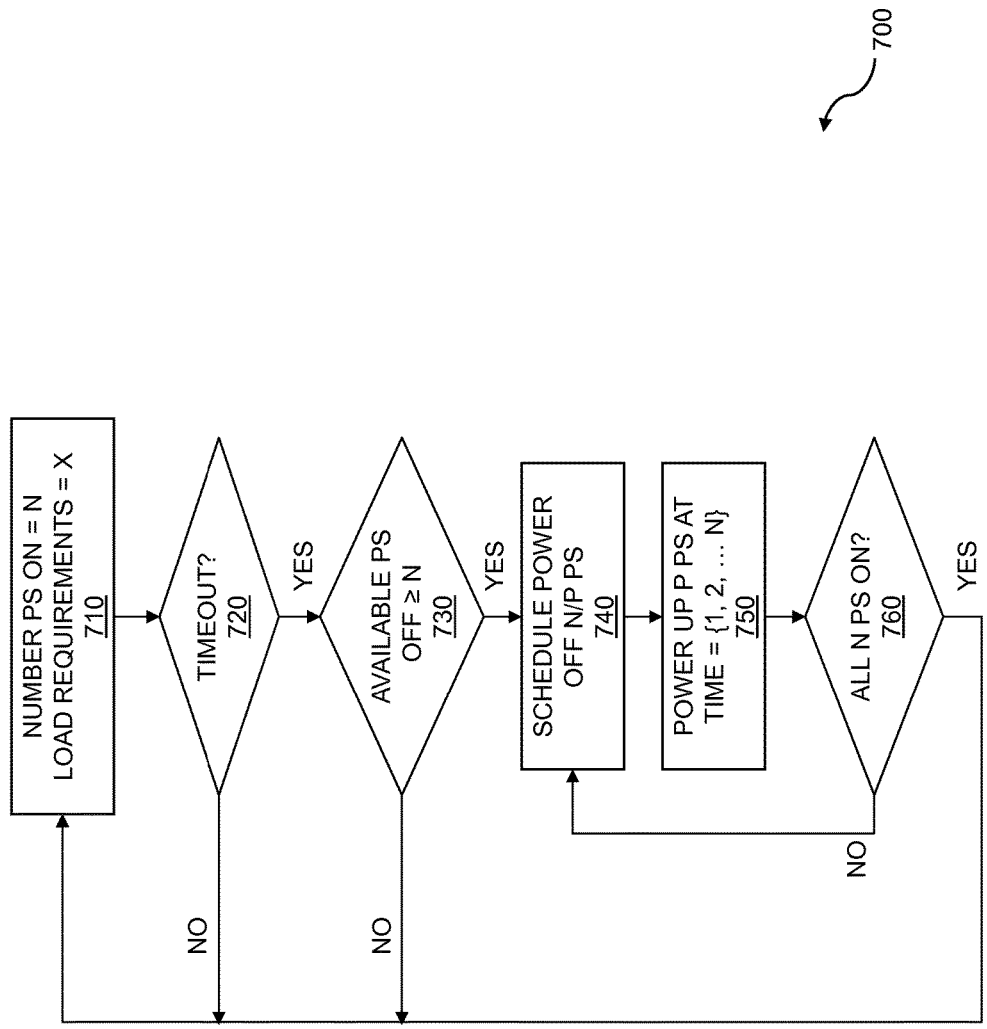
FIG. 7 is a flow diagram for power source rebalancing.

FIG. 7 is a flow diagram 700 for power source rebalancing. As described above, power requirements of an IT data center can include DC power loads and AC power loads. The DC power can be substantially 12V and can be used to power servers, network switches, backup systems, etc. Other DC voltages, for example 48V, can also be required and can be produced by the use of DC-to-DC converters, etc. The AC power can be substantially 208V and can be used to power legacy IT equipment and other equipment. Other AC voltages can also be required and can be produced by the use of other DC-to-AC converters. To provide the DC power and the AC power within the IT datacenter, various power sources can be made available. The power sources can include power supplies and batteries to provide power to DC loads, and DC-to-AC converters to provide power to the AC loads. The DC power load requirements and the AC power load requirements can be dynamic. The DC power loads and the AC power loads can be monitored and analyzed. Based on the analysis of the DC power loads, the DC power sources, including the power supplies and the batteries, can be enabled to meet the dynamic DC power load requirements. Similarly, based on the analysis of the AC power loads, the AC power sources, including the DC-to-AC converters, can be enabled to meet the dynamic AC power load requirements.

The flow 700 starts with obtaining the number of power sources that are on and the load requirements for the system 710. The numbers of power sources that are on can be determined by sensors coupled to the power sources, from data in a table including power source statuses, and so on. Sensors coupled to the loads can determine the power requirements of the loads. The load requirements can include DC power loads and AC power loads. The flow continues by determining if a timeout period has been reached 720. In embodiments, the timeout period is user specified. In other embodiments, the timeout period is automatically established. In some embodiments, the timeout period ranges from 5 seconds to 100 seconds. Two outcomes can occur based on timeout: NO or YES. If NO is true (that is, a timeout period has not been reached) then the flow returns to step 710. If YES is true (that is, a timeout period has been reached), the flow continues by determining if the number of available power sources that are off is greater than or equal to the number of power sources that are currently on 730. Two outcomes can occur based on the available number of power sources: NO and Yes. If NO is true, the flow returns to step 710. If YES is true, the flow continues with scheduling a subset of power sources to turn off 740. The flow then continues by turning on a subset of different power sources 750. In embodiments, the turning on is performed in stages. For example, if rotating four power sources is desired, then, in some embodiments, a new power source can be turned on while another power source is turned off, with the process repeated until all the needed power sources (power supplies, batteries, DC-to-AC converters, etc.) are on 760. The flow then returns to obtaining the number of power sources that are on. Two outcomes can occur based on whether all N power sources are on: NO and YES. If NO is true, then the flow returns to scheduling a subset of power sources to turn off 740. If YES is true, then the flow returns to the load requirements for the system 710, and the flow continues.

Management of power source enablement based on power load requirements and including both DC loads and AC loads can comprise choosing which power sources to enable at which time. The dynamic enablement and disablement of power sources can be thought of as a scheduling problem, where the power loads are matched to power sources. One risk of matching, if the matching technique is naïve, is that certain power sources can be selected for matching with power loads more often than other sources are selected. One objective of power source management can be balancing the amount of time that a given power source is selected. Another objective of power source management can include choosing a power source that can be operated at its most efficient operating point. Other power source management objectives can be imagined including rebalancing.

Regarding rebalancing in a power-matched intelligent energy control realm, it is highly likely that a given number of power source units (PSUs) will remain selected and powered on for an extended period of time based on prevalent existing load conditions. For example, an enterprise resource planning (ERP) server farm might see increased activity (80-90% IT load) around the end of a pay-period, fiscal year quarter, or calendar year quarter, requiring a maximum "N" number of power sources (supplies) to be on during that period. Alternatively, under common usage conditions, the server farm might remain at around 50% IT load. This can roughly equate to 30% lower power supply requirements during the majority of the year, and result in 0.7*N power supply units remaining ON for a long period of time, leading to overuse and premature aging of the continually running systems. The disclosed embodiments alleviate this situation by gently migrating the power supply units periodically and non-disruptively while keeping phase balancing and age balancing requirements intact.

Figure 8:
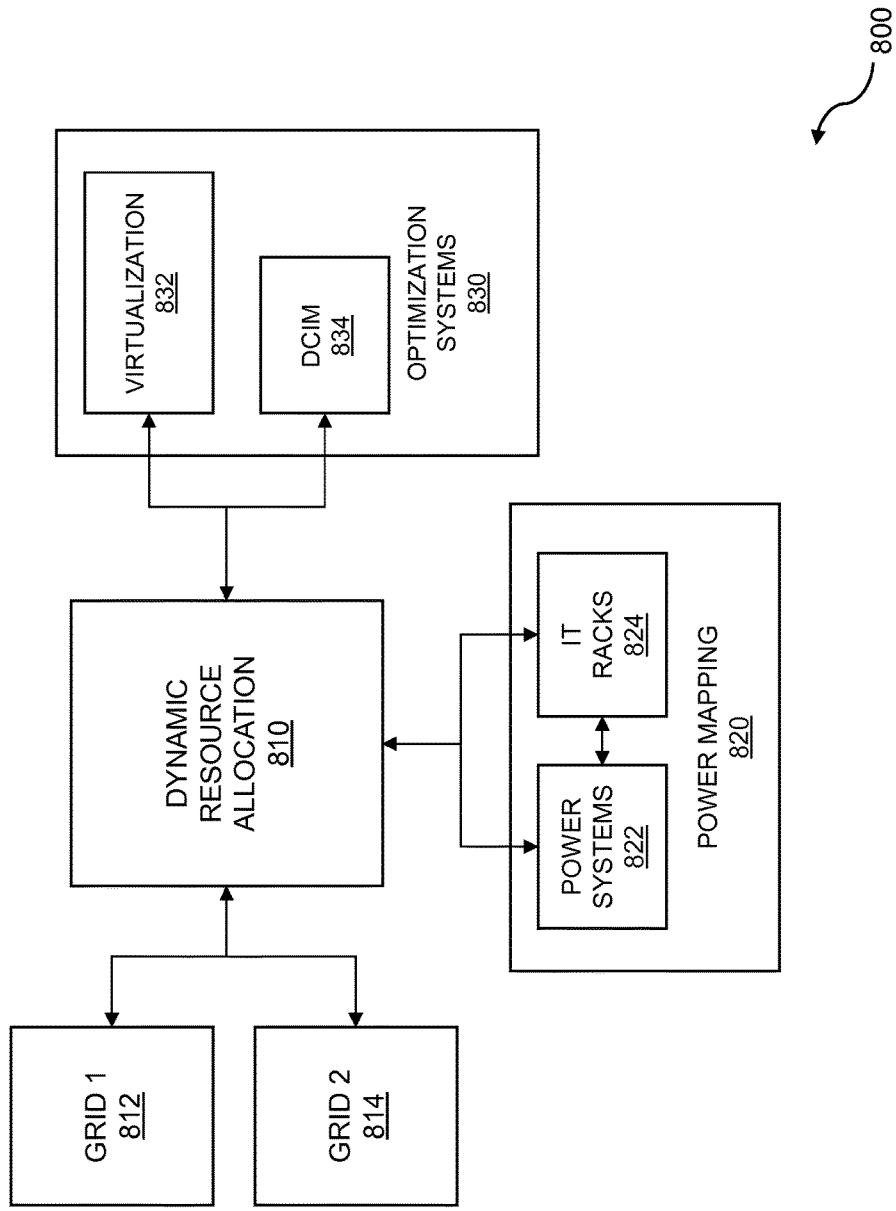
FIG. 8 is a block diagram for dynamic resource allocation.

FIG. 8 is a block diagram for dynamic resource allocation. The objectives of power requirement analysis and power source enablement can be expanded to include grid and other power sources, as well as optimization systems. The grid power and the optimization systems can be analyzed to determine various usage plans including load balancing, usage optimization, and so on. A system 800 is shown which provides dynamic resource allocation 810. A plurality of grids, including Grid 1 812 and Grid 2 814 are dynamically powered based on the dynamic resource allocation 810. A plurality of power systems 822 are coupled to IT racks 824 and other items requiring power. Power mappings 820 determine the coupling between sources and loads. The dynamic resource allocation 810 enables various applications to be powered including virtual machines 832 and data center infrastructure management (DCIM) applications 834. The power usage is optimized across the various systems 830. The system for power control can comprise: a plurality of power sources coupled to the one or more processors which provide control for the plurality of power sources, a plurality of applications coupled to the plurality of power sources which provide power to the plurality of applications, a memory which stores data, a dynamic allocation table stored in the memory where the dynamic allocation table enables dynamic power control of the plurality of power sources, one or more processors coupled to the memory wherein the one or more processors manipulate the data and where the one or more processors are configured to: group the plurality of applications into two or more groups, apply policies to accomplish grouping into the two or more groups, and update the dynamic allocation table based on the policies. The dynamic power control can be based on constraints where the constraints include power capacity within the plurality of power sources, power available on a line, power available for phase, pricing of power by a utility, or health of a power source. The dynamic power control can be based on a cost minimization function. The plurality of applications can include data center racks, lighting, cooling, or IT hardware. The memory can comprise a plurality of memories.

Figure 9:
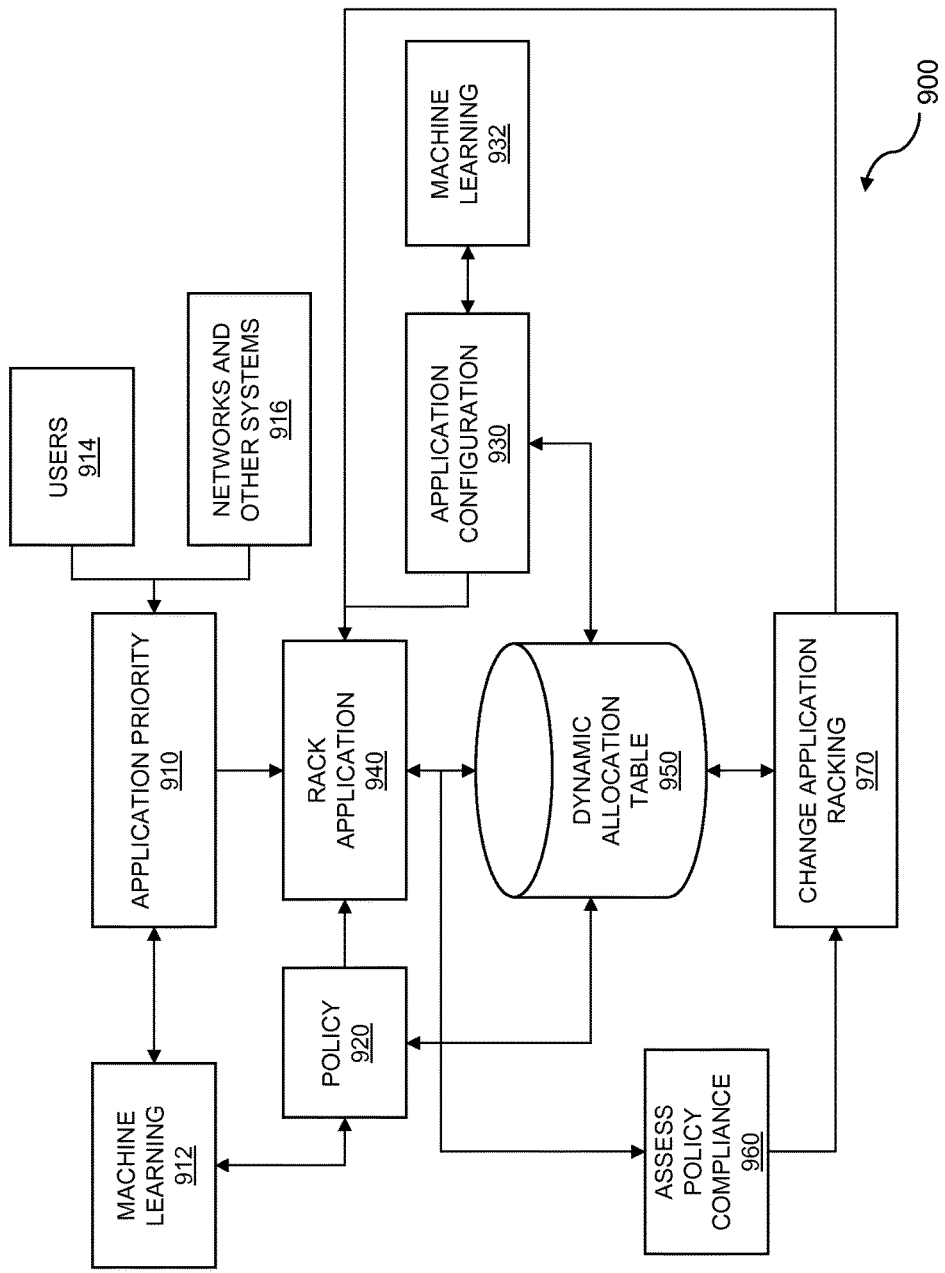
FIG. 9 is a block diagram for application priority.

FIG. 9 is a block diagram 900 for application priority. A plurality of applications can be powered by a plurality of power sources. As was the case for various pieces of IT hardware in a datacenter, the applications that execute processes on the IT hardware can be analyzed for power load requirements. From the analysis of the power load requirements, power sources can be enabled and disabled to match the power load requirements. The applications can be given priorities 910. The applications can be racked or grouped 940 based on policies 920. The grouping can be defined within a dynamic allocation table 950, and as application racking is changed 970 the dynamic allocation table 950 can be updated. The grouping can be changed, at least in part, based on an assessment of policy compliance 960. Applications can be configured 930 across various processors and/or power sources. Users 914, along with network and other system 916 needs, determine application priorities 910. Machine learning 912 can help the policies 920 and application priorities 910 optimize power utilization. Further, machine learning 932 can adjust application configurations 930. The system can update the dynamic allocation table based on compliance with the policies. The system can evaluate compliance to the policies and perform the dynamic power control based on the evaluation. Dynamic power control can control power sources from third party providers. The system can be further configured to perform machine learning 912 on the policies to improve power control. The system can also be configured to perform machine learning 932 in configuration of the applications. The applications can be modified to make a change in the grouping. The dynamic allocation table can contain entries for the plurality of power sources. The plurality of power sources can each be represented by a column within the dynamic allocation table. The dynamic allocation table can also contain entries for the plurality of applications. Each of the applications can be represented by a row within the dynamic allocation table. The plurality of applications can be allocated to the plurality of power sources using the dynamic allocation table. One of the plurality of categories can be transferred to other power sources when a power limitation is encountered. The priorities can change dynamically and allocation can be updated based on dynamic changes to the priorities. Dynamic power control can enable peak load sharing. An application from the plurality of applications can be powered by one power source from the plurality of power sources and can be changed to be powered by a second power source as a result of a change in the dynamic allocation table. The dynamic allocation table can be configured to optimize power utilization by the plurality of power sources. Optimization can be accomplished by turning off one or more power sources from the plurality of power sources in response to changing entries in the dynamic allocation table.

Figure 10:
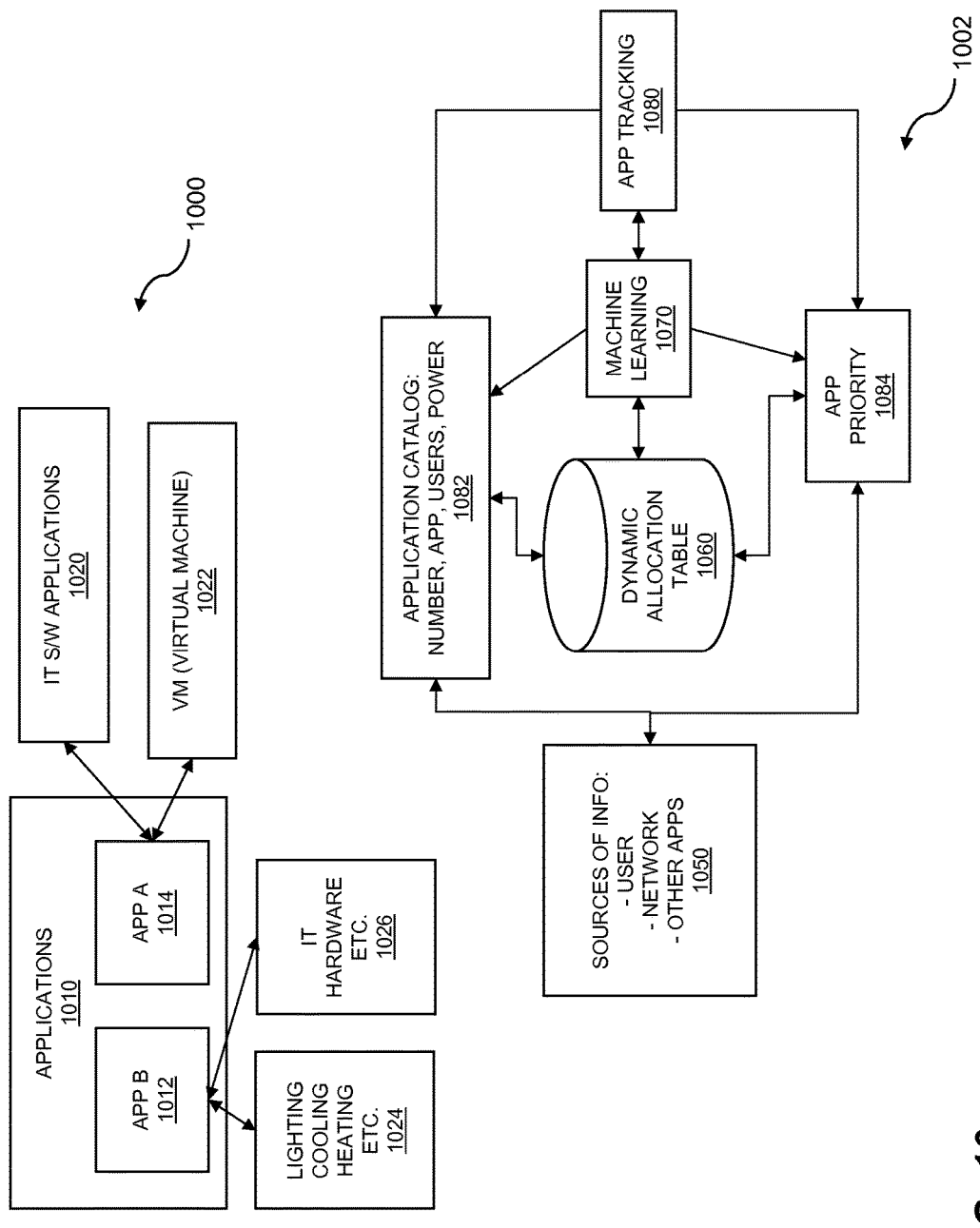
FIG. 10 shows dynamic allocation table usage.

FIG. 10 shows dynamic allocation table usage. A plurality of applications 1010 can be running 1000. Application A 1012 and Application B 1014 from the plurality of applications 1010 can include lighting, cooling, heating, 1024 and other systems. The applications can be various types of IT hardware 1026. The applications can include IT software applications 1020. The applications can be run on virtual machines 1022. A dynamic allocation table 1060 can contain information on the applications, power sources, and compute resources. The applications can be given various priorities 1084. The applications can be tracked 1080 and priorities updated as needed. Information on the applications can be cataloged 1082. Machine learning 1070 can be applied to optimize power utilization. Information on the applications 1050 can be provided to or sourced from various users, networks, and other applications. The plurality of applications can be allocated based on priorities. Lower priority applications can be powered down when a power limitation is encountered. Priorities can be defined by a plurality of categories. One of the plurality of categories can be powered down when a power limitation is encountered. Optimization can be based on power source redundancy. Optimization can be learned over time. Learning over time can be accomplished by learning typical power requirements of the plurality of applications.

Figure 11:
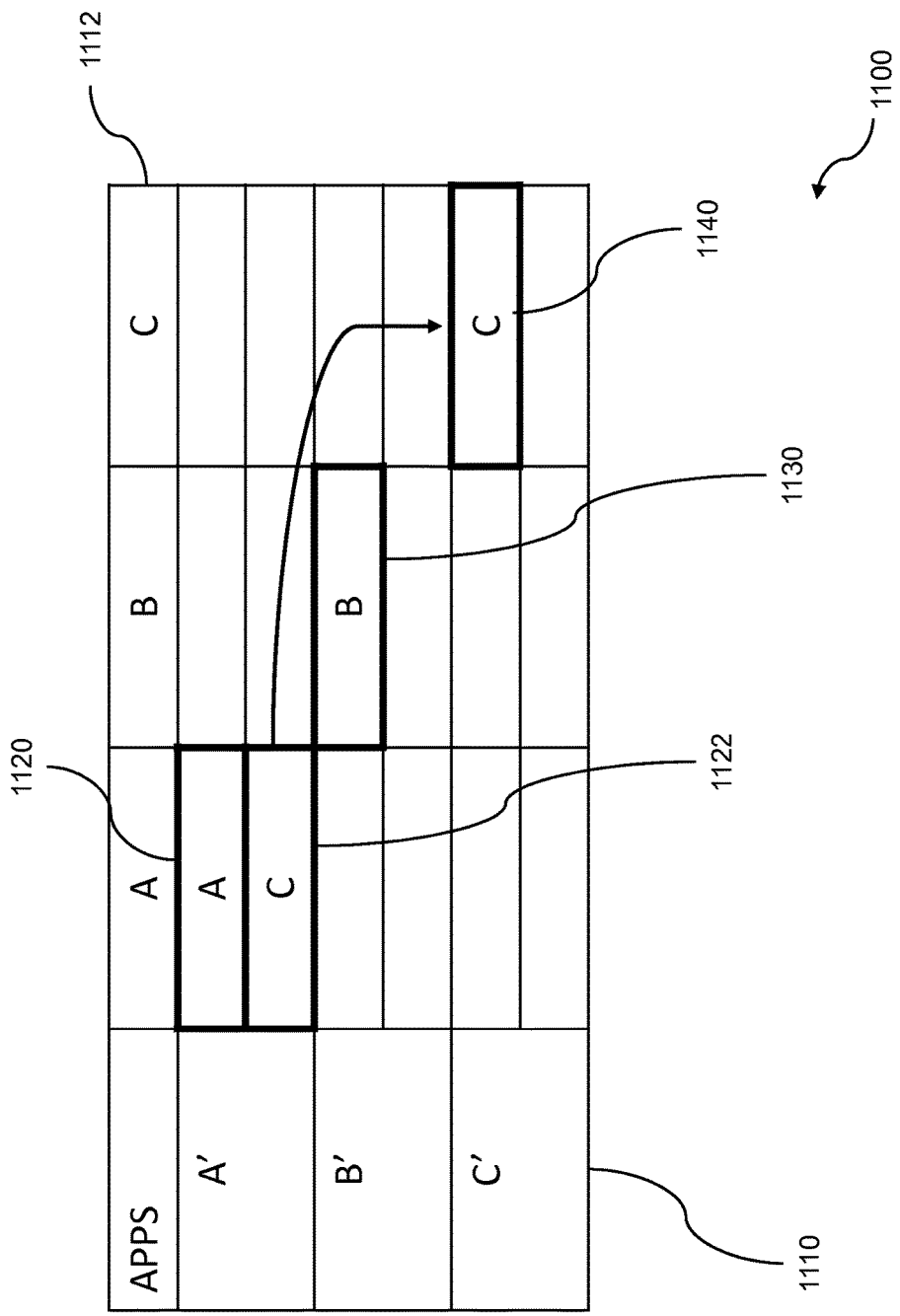
FIG. 11 shows an example dynamic allocation table.

FIG. 11 shows an example dynamic allocation table 1100. Applications can be assigned to various pieces of IT hardware based on various optimization metrics including priority, execution requirements, and so on. The various IT racks within a datacenter can be categorized, grouped, and ranked based on a variety of criteria including computational capabilities, power consumption, storage capacity, and so on. Entries 1112 in the dynamic allocation table 1100 can represent the ranked IT racks using labels such as A, B, and C as shown. Other labeling schemes can also be used. The various IT tasks required by a given enterprise or organization can also be categorized, grouped, and ranked based on a variety of criteria including priority, complexity, power consumption, and so on. Entries 1110 in the dynamic allocation table 1100 can represent the ranked IT tasks using labels such as A', B', and C' as shown. Any other appropriate labeling schemes can also be used. Allocations or mappings of groups of ranked IT tasks to ranked IT racks can be included in the dynamic allocation table. When excess IT capacity remains after assigning higher priority tasks, lower priority tasks can also be assigned. Mapping 1120 shows an allocation of A' tasks to IT rack A, and an allocation of C' tasks 1122 to IT rack A as well, due to excess capacity of IT rack A. Similarly, mapping 1130 shows an allocation of B' tasks to IT rack B. When the A' tasks 1120 require more IT resources, the C' tasks 1122 can be migrated to lower priority IT rack C, as shown in 1140. The migration of lower priority tasks frees up IT resources required by the higher priority tasks. The dynamic allocation table can be updated as needed as a result of the changing resource requirements of the prioritized groups of tasks.

Figure 12:
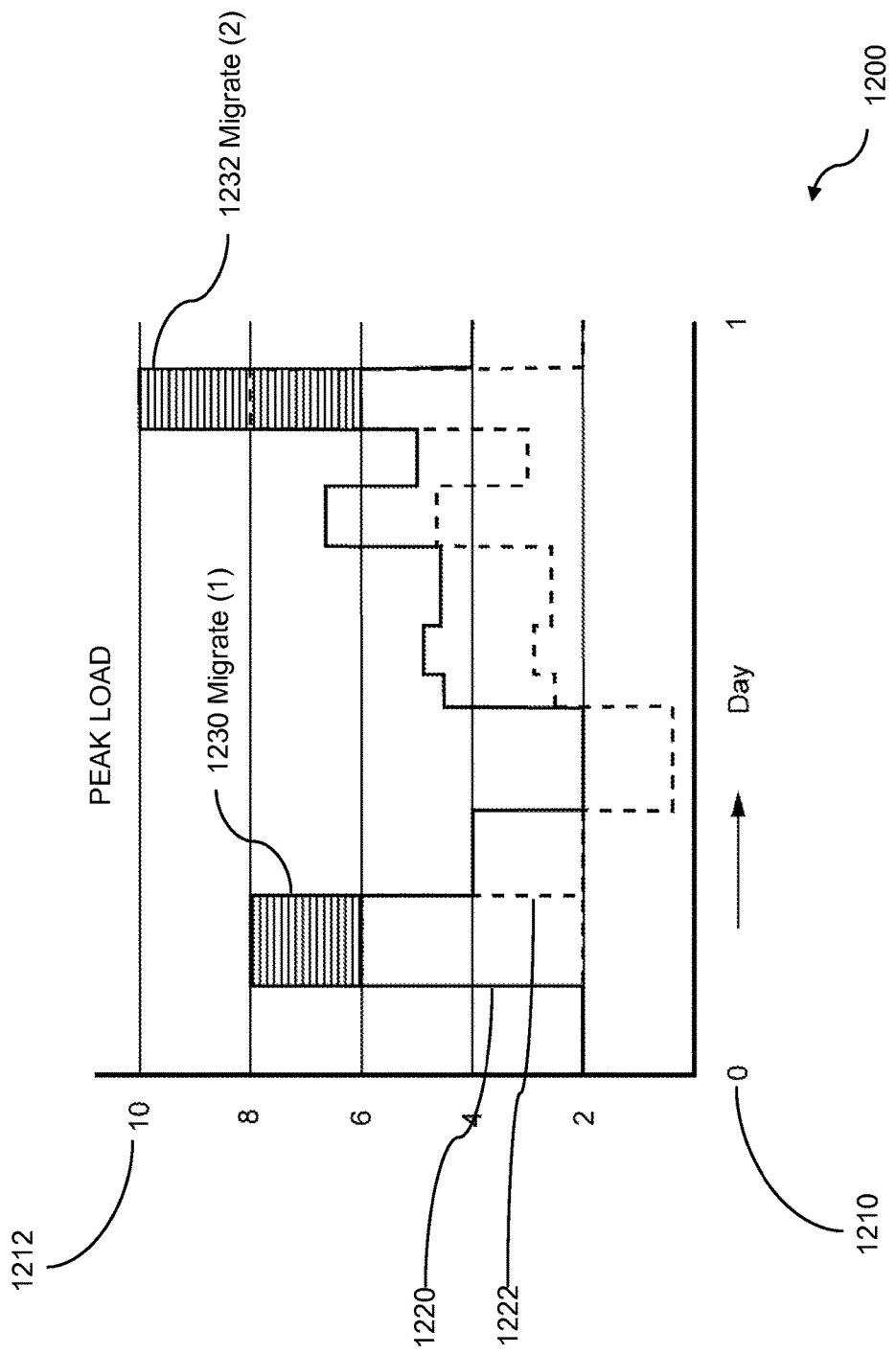
FIG. 12 describes example application migration.

FIG. 12 is an example of application migration 1200. One or more applications can be migrated from a first group of IT hardware to a second group of IT hardware to improve power management, balance power requirements, etc. The various IT resource requirements of the prioritized groups of tasks can be plotted with respect to time. The graph 1200 can indicate varying loads 1212 placed on one or more IT racks of processors throughout a given day 1210. The loads can include power loads. As can be seen in the graph 1200, the load imposed by the various tasks that are executing can change throughout the day. The IT requirement variations can be due to changing priorities of the tasks, the numbers of tasks executing, and so on. Two graphs of power requirements for groups of tasks are shown, 1220 and 1222. The graphs can represent two different priorities of groups of tasks throughout a given day, for example. When the load requirements of the groups of tasks exceed a given threshold, then various steps can be taken to ameliorate the situation. The steps taken can include throttling back or suspending the lower priority tasks in order to free up resources for the higher priority tasks. Additional steps that can be taken can include migrating tasks from the current set of racks to a second set of racks. The second set of racks can have capabilities similar to the first set of racks, reduced capabilities, and so on. Depending on the total load, different migration schemes can be undertaken. One migration scheme 1230 can be undertaken when the peak load exceeds a first threshold. A second migration scheme 1232 can be undertaken when the peak load exceeds a second threshold. The task or set of tasks that are migrated by the first scheme 1230 and the second scheme 1232 can be the same tasks or different tasks. The migration schemes can include lower priority tasks, medium priority tasks and higher priority tasks. For example, the first migration scheme 1230 can include only lower priority tasks, while the second migration scheme 1232 can include both lower priority tasks and higher priority tasks.

Figure 13:
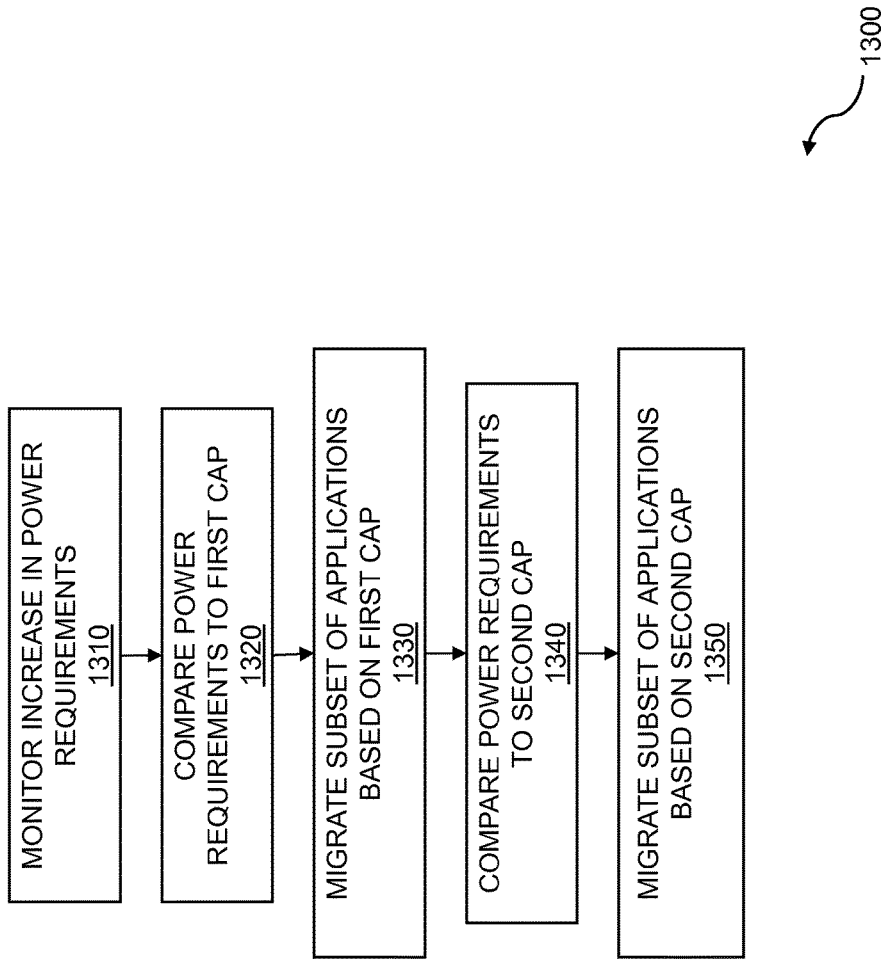
FIG. 13 is a flow diagram for dynamic power capping.

FIG. 13 is a block diagram for dynamic power capping. A group of tasks can be assigned to a set of IT resources for execution. The assignment can be based on task priority, IT resources available, power requirements, and so on. A block diagram 1300 describes dynamic power capping for a group of tasks that is executing. The rules for dynamic power capping can be based on priority of the executing tasks, the quantity of tasks to be executed, the precedence of executing tasks, and so on. Dynamic power capping can include monitoring for an increase in the power requirements 1310 of the tasks that are executing. The monitored power load requirements can be compared to a first power load cap 1320. A first subset of the applications that are executing and in part causing the power requirements can be migrated based on the first cap 1330. The monitored power load requirements can be compared to a second power load cap 1340. A second subset of the applications that are executing and in part causing the power load requirements can be migrated based on the second cap 1350.

Figure 14:
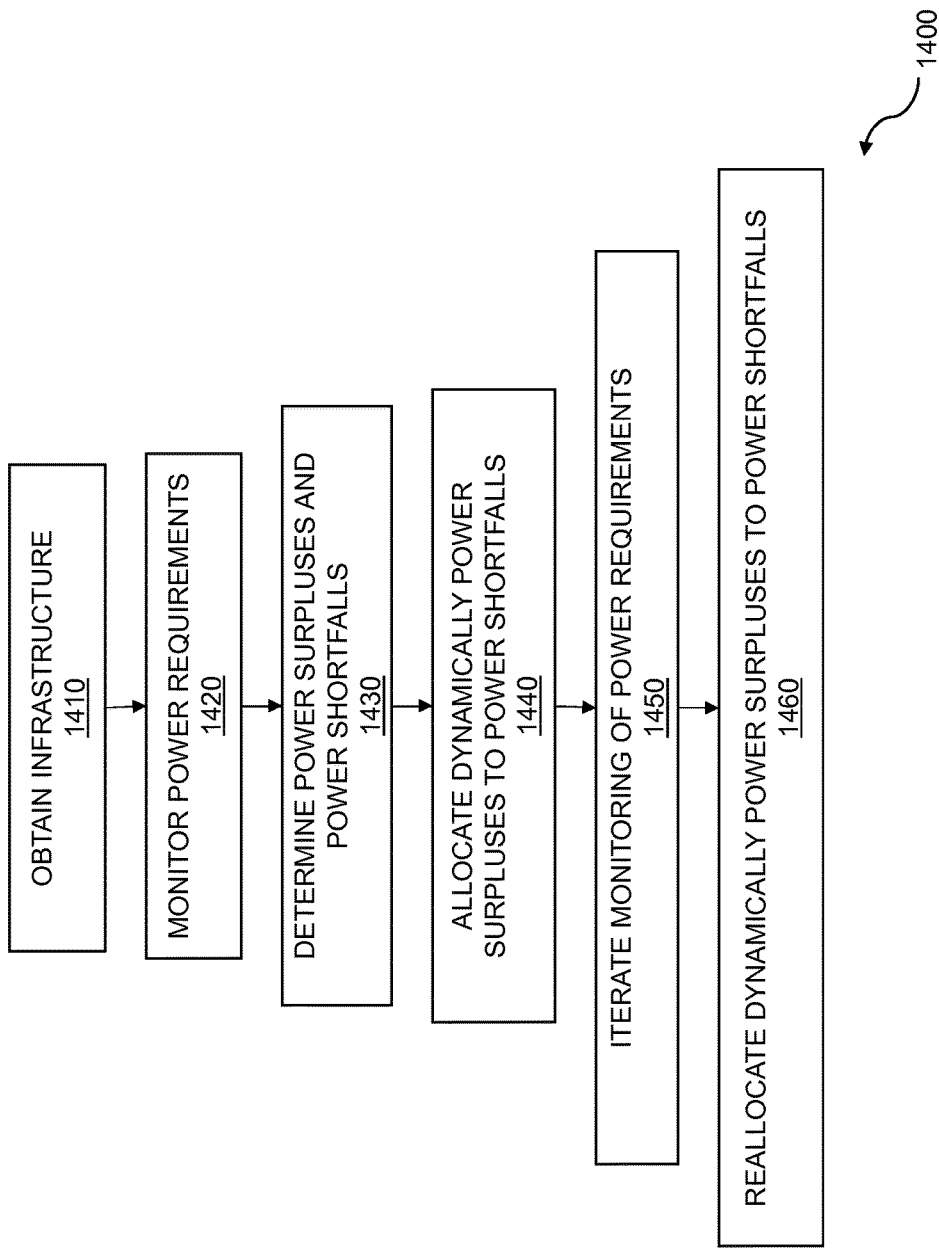
FIG. 14 is a flow diagram for dynamic power capacity allocation.

FIG. 14 is a flow 1400 for dynamic power capacity allocation. A given IT datacenter can include IT resources that possess various capabilities and that present various power loads. The flow 1400 shows a method for the dynamic power allocation of a plurality of power sources to a plurality of power loads. The power allocation can change dynamically over time. For example, the power allocation can change depending on processing task mix, time of day, day of week, day of month, month of year, and so on. The flow 1400 begins with obtaining an IT infrastructure 1410 including a plurality of power sources and a plurality of power loads. The plurality of power sources can include batteries, generators, utilities, locally produced power, and so on. Recall that datacenters can be constructed with racks holding various types of equipment that make up an IT infrastructure. The IT infrastructure can include equipment such as servers, blade servers, storage devices, backup devices, networking equipment, telephony equipment, power supplies, batteries, and so one. The equipment in a given rack can be homogeneous or heterogeneous. Each rack can include one or more power sources that can be connected to the power loads in the rack and to power loads in other racks. The power loads presented by a given rack can depend on the equipment housed in the rack and the mix of tasks assigned to the equipment in the rack, for example. The power requirements of the IT infrastructure in the datacenter and of the equipment in the various racks that make up the IT infrastructure can be dynamic. That is, the power requirements can change due to equipment in the rack being turned on and off, due to changing the mix of tasks assigned to the equipment in the rack, and so on.

The flow 1400 continues with monitoring the power requirements 1420 of the IT infrastructure. Given the mix of tasks assigned to a given rack and the enabled and disabled power loads of the given rack, the instantaneous power requirements of the power loads can be determined. The power loads within a given rack can change over time, while the power capacity of the IT datacenter can remain constant. The flow 1400 continues with determining power surpluses and power shortfalls 1430 of the plurality of power sources. The power load requirements of a given rack can be compared to the power source capabilities within the rack. Shortfall power capacity can be identified in the rack or racks containing the IT infrastructure when there is insufficient power to meet the power load demands. Surplus power capacity can be identified in the rack or racks containing IT infrastructure. The flow 1400 continues with allocating dynamically the power surpluses to the power shortfalls 1440. The dynamic allocation can be determined on a rack-by-rack basis. The surplus power from racks containing some of the IT infrastructure can be dynamically allocated to other racks containing other portions of the IT infrastructure. While the power sources are being allocated to the power loads, batteries can be enabled to provide power for dynamic increases in the power requirements. As the power sources come online, the batteries can be disabled. The dynamic allocation of power can increase the power provided to one or more IT racks and can decrease the power provided to one or more other IT racks. The connection choice for a subset of the plurality of power sources to couple to the plurality of power loads can be based on the reliability, redundancy, and health of the power sources. For example, processing jobs with high priority can be assigned the power sources with high reliability to help ensure that the processes can be completed within a specific time period. Similarly, processing jobs with low priority can be assigned the power sources that are operating properly but have higher usage hour numbers. The power sources with high usage hour numbers can be considered "less healthy" because of the MTTF figures for the components that make up the power sources. The overall power capacity of the IT datacenter can remain constant. For example, imagine that 30 kilowatts of power are available to meet the needs of the power loads of in IT infrastructure including racks. The power need not be divided equally among the racks. Instead, the power can be allocated based on the power load requirements of each rack at a given time. As the power load requirements of the racks change, the power can be allocated differently to meet the new power load requirements. The allocating can be provided dynamically based on historical power usage patterns. The historical data can be based on typical processing job mix, peak daily job mix, peak monthly job mix, and so on.

The flow 1400 continues with iterating for the monitoring of the power requirements 1450 of the plurality of power loads. The power requirements of the various IT components within the racks, and the various IT racks in the datacenter can change dynamically over time. The iterating can monitor the power loads periodically to determine instantaneous power needs. The iterating can be based on predefined time intervals, real time intervals, statistical monitoring models, historical monitoring models, and so on. Any appropriate iterating scheme can be used with the monitoring. The flow 1400 continues with further determination of the power surpluses and power shortfalls of the plurality of power sources in the plurality of IT racks in the datacenter. The power requirements of the power loads within a given rack can change dynamically while the power available from the power sources in the rack can remain constant. Thus, the instantaneous power load requirements can result in instantaneous power surpluses in some of the IT racks and instantaneous power shortfalls in others of the IT racks. The flow 1400 continues with reallocating dynamically the plurality of power surpluses to the power shortfalls 1460. Surplus power identified in one or more IT racks can be reallocated to one or more IT racks exhibiting power shortfalls at a given instant. The reallocation can be based on historical power usage patterns, statistical usage models, predictive usage models, and so on. As the power usage requirements of the power loads continue to change over time, the reallocation can change the allocation of power surpluses to the power shortfalls.

Figure 15:
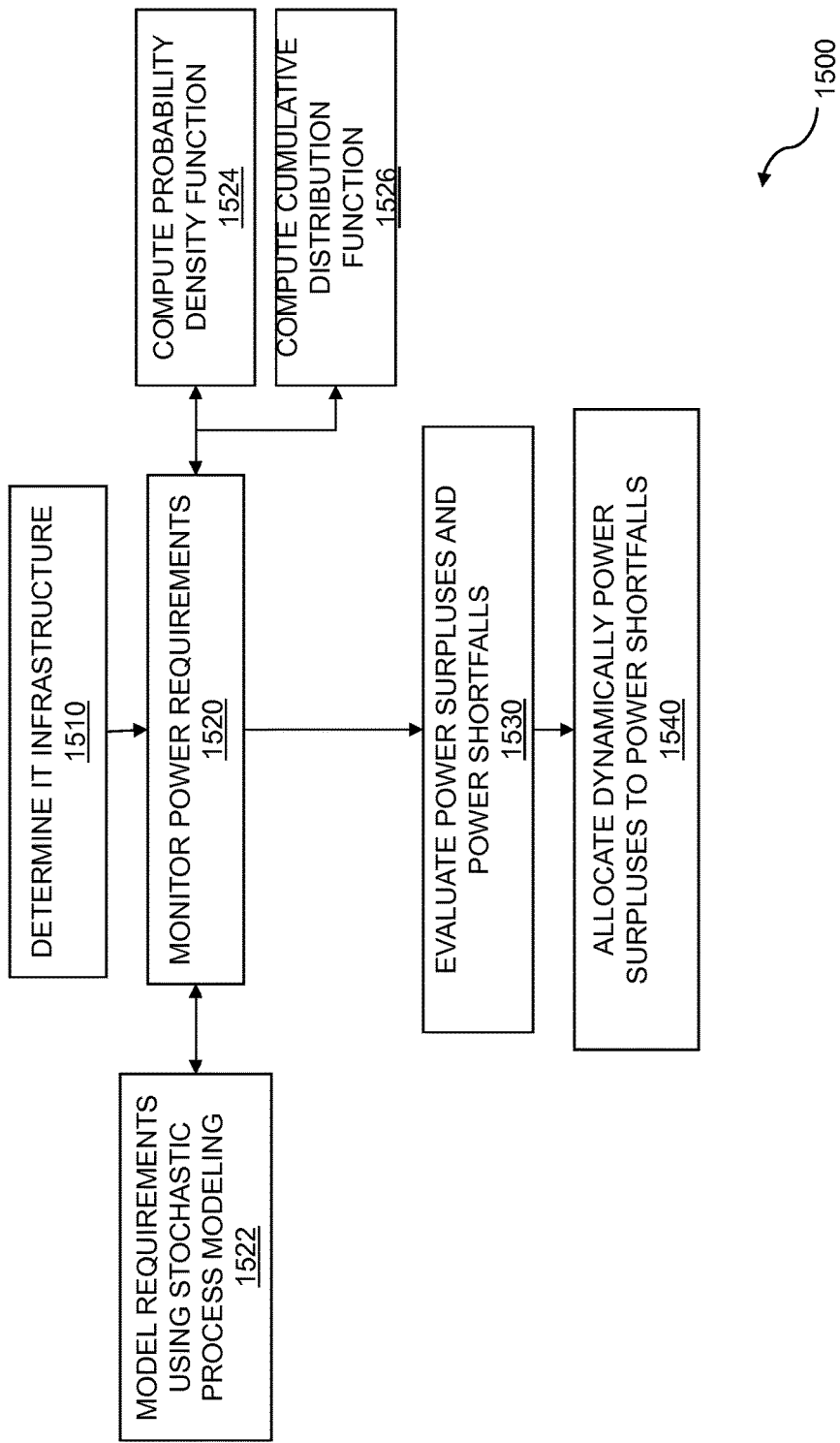
FIG. 15 is a flow for dynamic power capacity allocation.

FIG. 15 is a flow for dynamic power capacity allocation. The flow 1500 shows a method for multi-level dynamic power control through capacity allocation of a plurality of power sources to a plurality of power loads. The power requirements of IT racks and the power allocation to the racks can change dynamically over time. As stated above, the allocation of power to various IT racks depends on a variety of factors including the equipment operating in the rack, the mix of compute jobs being performed by that equipment, and so on. Further, the power requirements can change dynamically based on time of day, day of week, day or month, month of year, and so on. The flow 1500 includes determining an IT infrastructure including a plurality of power sources and a plurality of power loads 1510. In embodiments, the determining includes identifying power sources and identifying power loads. The power sources can include power supplies, batteries, utility (line) power, and locally produced power including generators, wind, solar, hydro, and so on. The power loads can be contained within an IT datacenter and within a plurality of racks within the IT datacenter, for example. The power loads can include servers, blade servers, network switches, network routers, storage systems, backup systems, HVAC systems, and so on. The equipment within a given IT rack in the IT datacenter can be homogeneous or heterogeneous. A rack can contain one or more power sources which can be connected to the power loads within the rack and to power loads in other racks. The power requirements of a given rack can depend on the equipment housed in the rack and whether the equipment is operating or idle, can be based on the mix of tasks performed by the equipment in the rack, and so on. The power requirements of the equipment can therefore be dynamic.

The flow 1500 continues with monitoring power requirements for the IT infrastructure 1520. As stated above, the power requirements can depend on the type of equipment, whether the equipment is operating or idle, the level of equipment operation based on the mix of compute jobs, and so on. The monitoring 1520 can evaluate power requirements for a portion of the IT infrastructure. Instantaneous power requirements can be determined by examining the mix of operating equipment and mix of compute jobs at a given time. The power requirements of the IT racks can vary over time while the power capacity of the racks, aggregate power of the racks, and the IT datacenter power can remain constant. The monitoring can evaluate power requirements on a rack within the IT infrastructure. Similarly, the monitoring can evaluate power requirements for a plurality of racks within the IT infrastructure. The monitoring includes modeling the power requirements using stochastic process modeling 1522. A stochastic process or random process can represent an evolution of a system including random variables over time. Modeling based on a stochastic process can be based on a probabilistic technique. The stochastic process can evolve in any of a variety of directions. The stochastic process modeling can describe probabilities for future power requirements. The stochastic process model can also be used to predict near-term future power requirements where the accuracy of the model can be higher. The stochastic process model can further be used to predict power configurations based on the available power sources including power supplies, batteries, grid power, and so on. The power provided from a power grid can provide a subset of the power requirements. Similarly, the power provided from one or more power supplies and one or more batteries can provide a subset of the power requirements. The monitoring can include computing a probability density function PDF 1524 associated with the power requirements. A probability density function can describe the relative likelihood of a random variable taking on a given value. For a given probability density function, the probability of the random variable falling within a range of values can be based on an area under a density function and above a horizontal axis, and between a minimum and a maximum value of the range. The monitoring includes computing a cumulative distribution function CDF 1526 associated with the power requirements. A cumulative distribution function can describe a probability that a real-valued random variable can be found to have a value less than or equal to a given value. The random variable can also have a given probability distribution.

The flow 1500 continues with evaluating power surpluses and power shortfalls of the plurality of power sources 1530. Using the techniques just described, the dynamic power requirements of the IT racks within the IT infrastructure can be determined. By comparing the dynamic power requirements to the dynamic power which is available, power surpluses and power shortfalls can be determined. The power surpluses and power shortfalls can be identified at various levels within the IT infrastructure including the equipment level, the rack level, the row level including rows of IT racks, and so on. The power surpluses and power shortfalls can be determined at any appropriate level within the IT infrastructure.

The flow 1500 continues with dynamically allocating the power surpluses to the power shortfalls 1540. Based on the power surpluses and the power shortfalls which can be evaluated, power surpluses can be allocated to power shortfalls. For example, surplus power from one or more power sources including power supplies, batteries, etc. can be allocated to the power shortfalls. The allocating can be accomplished using a variety of techniques. The allocating can enable one or more power supplies. The one or more power supplies can be enabled as needed to meet dynamic power requirements. The allocating can enable one or more batteries. The one or more batteries can be enabled as needed to meet dynamic power requirements while the power supplies are coming online, for example. In other embodiments, the allocating can enable one or more generators, one or more local power sources, and so on. Various steps in the flow 1500 may be changed in order, repeated, omitted, or the like without departing from the disclosed concepts. Various embodiments of the flow 1500 may be included in a computer program product embodied in a non-transitory computer readable medium that includes code executable by one or more processors.

Figure 16:
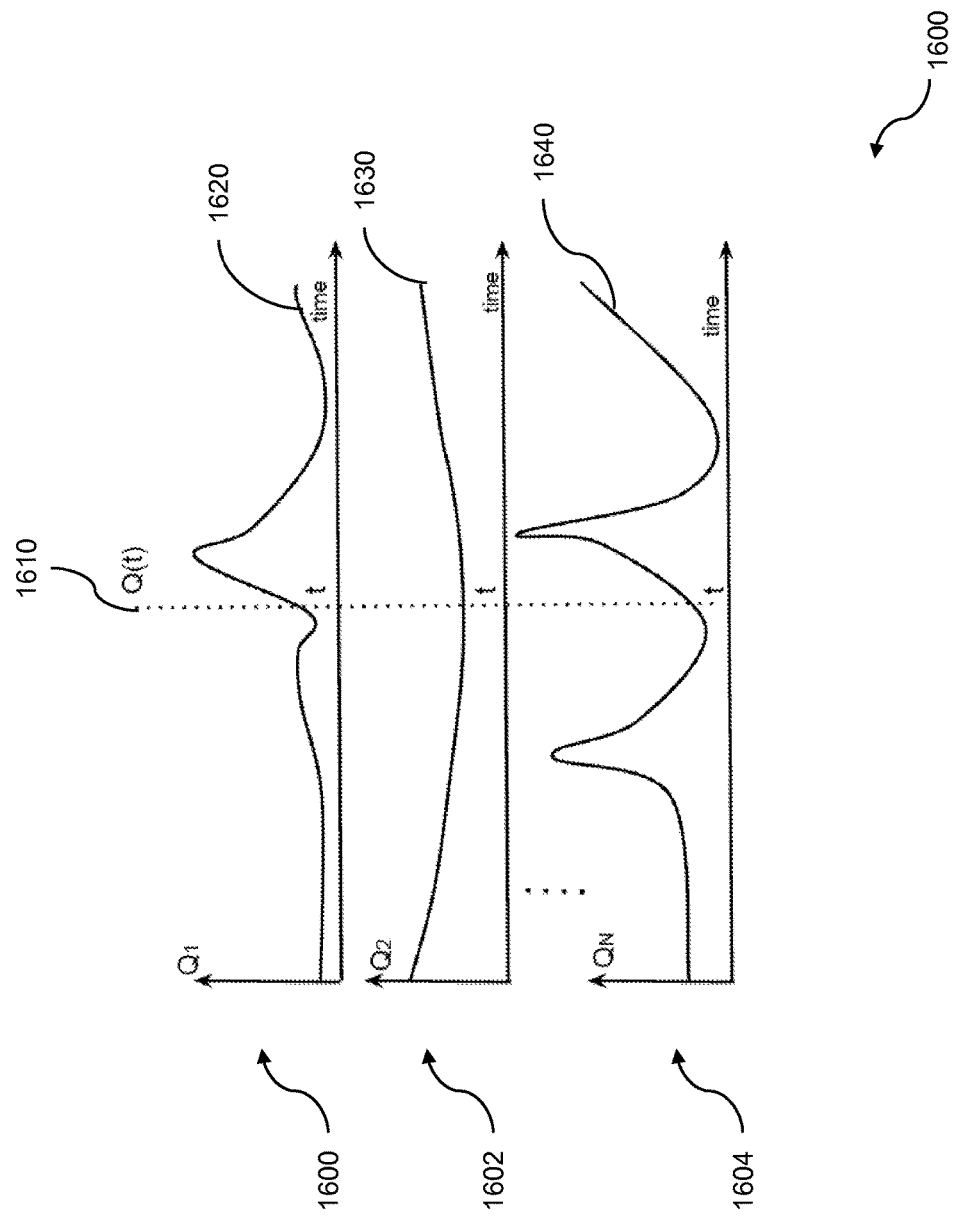
FIG. 16 is an example of stochastic process modeling.

FIG. 16 is an example of stochastic process modeling. A stochastic process model can be based on a stochastic process that can include a set of random variables that vary over time. The various IT racks situated in an IT datacenter consume power. The power consumption of a given rack can be dependent upon the equipment housed in the rack, what equipment is powered up, powered down, throttled, etc. In addition, the power consumption can be dependent on the particular compute jobs assigned to the IT equipment in the rack. The power consumption of a given rack can also be time dependent. The power available in a given rack can be represented by the expression Pi, where P is power and i is the power available in the i-th rack. The power which is available can be provided by a power grid, by a battery, and so on. The total power availability of the datacenter can be defined by the expression Pmax, which is found by summing each Pi. The power consumed (power load) by a given rack can be defined by the expression Qi, where Q is power consumption, and i is the i-th rack. The power consumed in a given rack can come from the power grid, the battery, etc. The power consumed Qi for a given rack can be greater than or equal to Pi. When Qi exceeds Pi, a power shortfall results. Surplus power elsewhere can be routed to alleviate the power shortfall. The power consumption of the racks can be plotted. Three plots, 1600, 1602, and 1604, show example power consumption for three racks in a datacenter. The curves 1620, 1630, and 1640, of plots 1600, 1602, and 1604 respectively, show time-varying power requirements of the three example racks. The power requirements, as can be seen in the three plots 1600, 1602, and 1604, can change significantly over time, and can change independently of other requirements within the same datacenter. For example, at a given time Q(t) 1610 the power requirements Qt for the three racks can be determined. If the power available in the three racks is greater than the power requirements, then the power from the power grid and/or the batteries can meet the power needs. If the power available in one or more given racks is less than the power requirements of the one or more racks, then power surpluses of some of the racks can be redirected to the power shortfalls of other racks. A stochastic process model can be determined for power consumption requirements over time of the equipment in a given rack. The stochastic process model can be used to predict future power requirements of the given rack.

Figure 17:
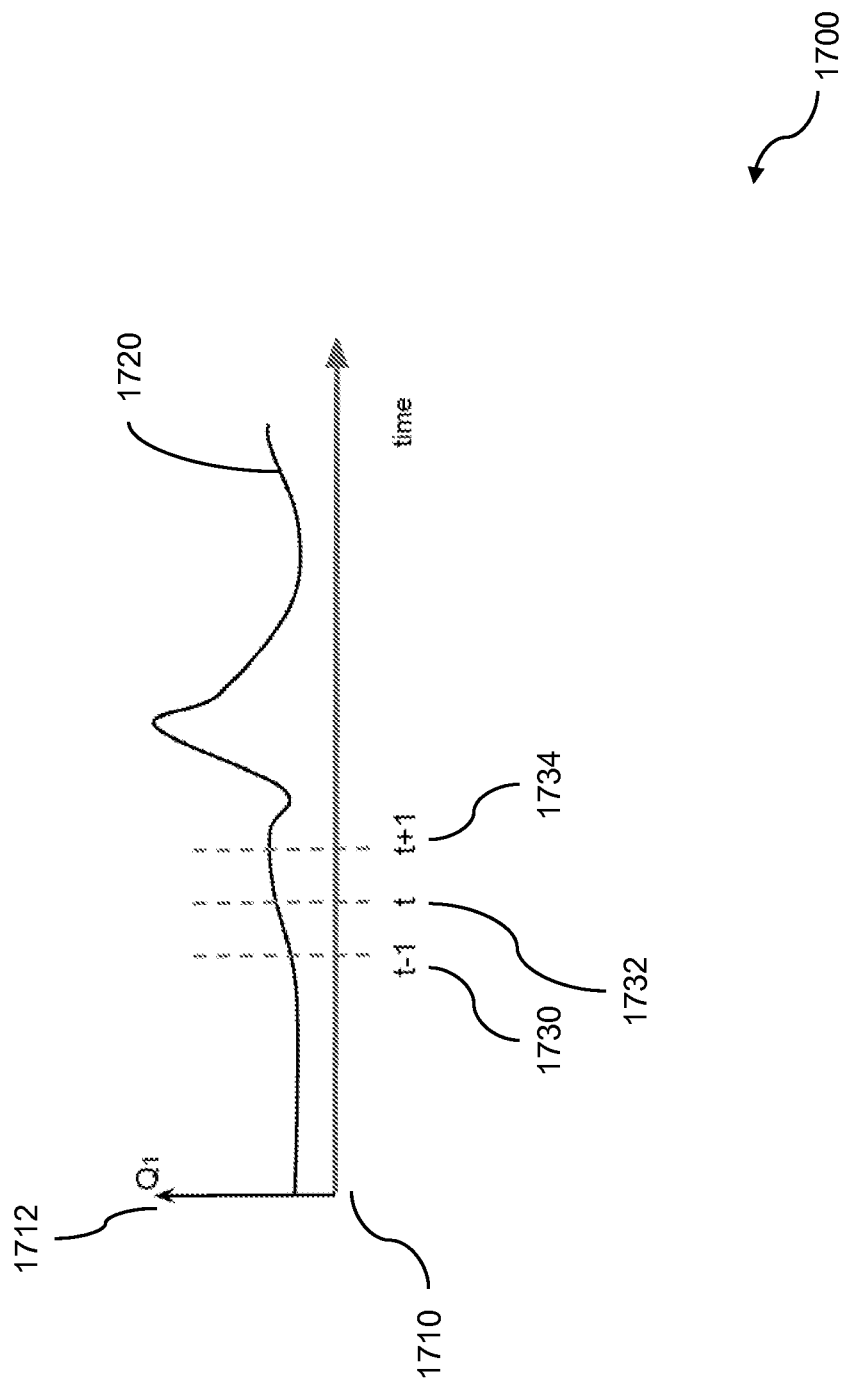
FIG. 17 is an example of quasi-stationary process usage.

FIG. 17 is an example of quasi-stationary process usage. A plot 1700 is shown in which a quasi-stationary process can be identified. Example power requirements, which vary over time for an IT rack containing various pieces of IT equipment and performing various compute tasks, can be shown. The power requirements 1700 include an amount of power required 1712 over time 1710. Based on the plot, a stochastic process model can be formed. A stationary stochastic process can be defined as a stochastic process whose probability distribution functions remain unchanged when the process is shifted in time. However, given the widely varying power consumption requirements shown by curve 1720, the probability distribution function cannot be presumed to remain unchanged over time. If the process shown by the curve 1720 were sampled using short time durations, then the probability distribution functions can resemble those of a stationary process. Consider three points in time, t−1 1730, t 1732, and t+1 1734. During the time interval between time t−1 1730 and time t 1732, a probability density function PDF and a cumulative distribution function CDF can be computed. Based on the PDF and the CDF which were computed, a prediction can be made for the power requirements between time t 1732 and time t+1 1734. The use of PDFs and CDFs determined for multiple racks can be used to determine global power behavior, for example. The global power behavior can be used to determine which power supplies can be turned on and/or can be turned off.

Figure 18:
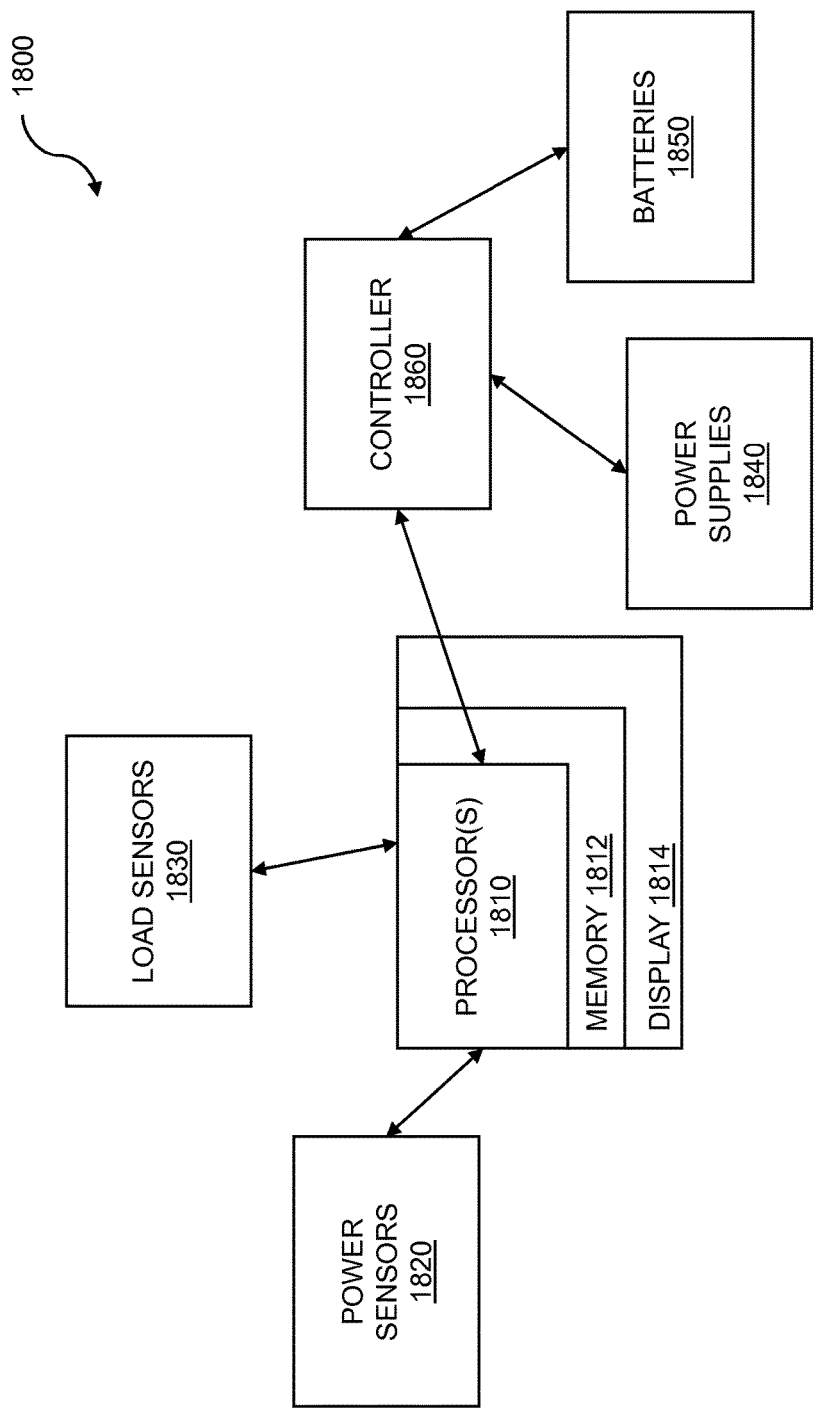
FIG. 18 is a system diagram for power control.

FIG. 18 is a system diagram for power control. The power control system 1800 can include one or more processors 1810 and a memory 1812 which stores instructions. The memory 1812 is coupled to the one or more processors 1810 wherein the one or more processors 1810 can execute instructions stored in the memory 1812. The memory 1812 can be used for storing instructions, for storing databases of power supplies, for storing information pertaining to load requirements, for storing information pertaining to redundancy requirements, for storing failure policies, for system support, and the like. Information about the various designs can be shown on a display 1814 connected to the one or more processors 1810. The display can comprise a television monitor, a projector, a computer monitor (including a laptop screen, a tablet screen, a net book screen, and the like), a cell phone display, a mobile device, or another electronic display. The power control system 1800 can further include one or more controllers 1860 configured to communicate with the one or more processors 1810, one or more power supplies 1840, and one or more batteries 1850. A plurality of power sensors 1820 and load sensors 1830 are configured and disposed to provide data to the one or more processors 1810. In embodiments, the plurality of power sensors 1820 monitors voltage, current, and temperature. A detection can be performed, using the plurality of power sensors 1820, which determines that one or more of the plurality of sensors is faulty. In embodiments, the detection is performed by employing redundant sensors and treating a sensor reading far outside the range of the other sensors as faulty.

The system 1800 can include a computer program product embodied in a non-transitory computer readable medium for power control comprising: code for accessing a plurality of power sources which are coupled to one or more power loads, code for detecting power requirements for the one or more power loads, and code for enabling one or more power sources from the plurality of power sources to match the power requirements of the one or more power loads wherein the enabling is a function of demand-side requirements.

In some embodiments, the system 1800 communicates with loads (e.g. servers in a server farm) to selectively decouple loads based on context, power consumption, and other factors in order to maintain power to critical systems while additional power sources are brought online to meet the new demand. Additionally, power sources can be rotated in and out of service to increase the service life of the power sources. The power sources can be controlled to operate in a peak efficiency range. The system 1800 can be implemented in a master-leaf hierarchy, where a master controller is in communication with multiple leaf controllers, which in turn each control a subset of power sources and/or other leaf controllers.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A processor-implemented method for data center power control comprising:
   accessing a plurality of power sources which are coupled to two or more power loads;
   detecting power requirements for the two or more power loads;
   enabling at least two power sources from the plurality of power sources to match the power requirements of the two or more power loads wherein the enabling is a function of demand-side requirements, and wherein the enabling optimizes the at least two power sources to set the at least two power sources in an efficient power range, and wherein the enabling includes assigning a low priority load from the two or more power loads to a first power source from the at least two power sources and a high priority load from the two or more power loads to a second power source from the at least two power sources, wherein the second power source has fewer usage hours than the first power source; and
   evaluating reliability for the plurality of power sources based on usage hours and controlling the at least two power sources from the plurality of power sources to enhance reliability of the plurality of power sources.

2. The method of claim 1 wherein the enabling includes a local enabling on a rack basis.

3. The method of claim 1 wherein the enabling includes a global enabling that is facilitated via a central appliance that works across racks in a data center.

4. The method of claim 1 wherein the plurality of power sources include one or more batteries and one or more power supplies.

5. The method of claim 1 further comprising decoupling loads from the plurality of power sources.

6. The method of claim 5 wherein the decoupling is a function of the detecting of the power requirements.

7. The method of claim 1 wherein the demand-side requirements are dynamic power requirements of the two or more power loads.

8. The method of claim 7 wherein the detecting includes detection of the dynamic power requirements.

9. The method of claim 1 wherein the detecting includes detection across multiple racks, across cages, across geography, across topology, or across hardware architectures.

10. The method of claim 1 wherein the enabling is performed dynamically as a function of dynamic power requirements of the two or more power loads.

11. The method of claim 1 wherein the detecting of the power requirements is performed by a plurality of sensors.

12. The method of claim 11 wherein one or more of the plurality of sensors is dynamically coupled to the at least two power sources or the two or more power loads.

13. The method of claim 1 wherein the enabling provides for assigned redundancy tiering.

14. The method of claim 1 further comprising selectively disabling a power source from the plurality of power sources based on reduced need from the two or more power loads.

15. The method of claim 1 wherein the plurality of power sources include one or more batteries and further comprising recharging the one or more batteries as part of the accessing.

16. The method of claim 1 wherein the plurality of power sources includes one or more power supplies where the accessing includes controlling output of the one or more power supplies.

17. The method of claim 1 further comprising monitoring power demands from the two or more power loads on an ongoing basis.

18. The method of claim 1 wherein the enabling provides for supply-side power management.

19. The method of claim 1 further comprising identifying, based on sensor data from the plurality of power sources, a power source that is operating below a quality threshold.

20. The method of claim 19 further comprising disabling the power source that is operating below the quality threshold.

21. The method of claim 1 further comprising deriving a stress value from health indications of fan health, battery health, DC voltage fluctuation, or operating temperature, and monitoring the stress value on each of the plurality of power sources, wherein each stress value is associated with one power source.

22. The method of claim 21 wherein power supplies are selectively disabled based on the stress value.

23. The method of claim 1 wherein power supply units are migrated for phase balancing and age balancing based on predicted time before failure for the power supply units, wherein the predicted time before failure is determined using Mean Time Between Failure (MTBF) data on the power supply units.

24. The method of claim 1 further comprising:
   providing dynamic power control for the plurality of power sources coupled to a plurality of applications;
   grouping the plurality of applications into two or more groups;
   applying policies to accomplish grouping into the two or more groups;
   storing a dynamic allocation table where the dynamic allocation table enables the dynamic power control of the plurality of power sources; and
   updating the dynamic allocation table based on the policies.

25. The method of claim 1 further comprising:
   evaluating an IT infrastructure including the plurality of power sources coupled to the two or more power loads;
   monitoring power requirements of the IT infrastructure;
   determining power surpluses and power shortfalls of the plurality of power sources; and
   allocating dynamically the power surpluses to the power shortfalls.

26. The method of claim 25 further comprising iterating for the monitoring of the power requirements and the determining of the power surpluses and power shortfalls.

27. The method of claim 25 further comprising reallocating dynamically the power surpluses to the power shortfalls.

28. The method of claim 23 wherein the allocating is provided dynamically based on historical power usage patterns.

29. The method of claim 1 further comprising:
   determining an IT infrastructure including the plurality of power sources and the two or more power loads;
   monitoring power requirements for the IT infrastructure;

evaluating power surpluses and power shortfalls of the plurality of power sources; and allocating dynamically the power surpluses to the power shortfalls.

30. The method of claim 1 further comprising:
obtaining a group of profiles for the plurality of power sources;
discovering information about a power source, from the plurality of power sources, using a plurality of sensors;
calculating a power source profile based on the information that was discovered;
comparing the power source profile with the group of profiles; and
classifying the power source based on the comparing.

31. The method of claim 30 wherein the power source does not provide information about its identity.

32. The method of claim 31 further comprising augmenting smart information provided by the power source with the power source profile that was calculated.

33. The method of claim 1 further comprising:
determining power requirements for a plurality of data center racks, wherein the plurality of data center racks comprise the two or more power loads;
evaluating power capabilities of the plurality of power sources coupled to the plurality of data center racks;
calculating stranded power capacity from the plurality of power sources; and
provisioning the plurality of power sources to provide power to the plurality of data center racks based on the stranded power capacity that was calculated.

34. The method of claim 33 further comprising negotiating with other power capabilities from other power sources to utilize stranded capacity in the other power sources.

35. The method of claim 33 further comprising optimizing supply-side power delivery from the plurality of power sources based on the stranded power capacity that was calculated.

36. The method of claim 33 further comprising optimizing load-side power usage by the plurality of data center racks based on the stranded power capacity that was calculated.

37. The method of claim 33 further comprising determining a priority order within the plurality of data center racks, using the priority order as part of the provisioning, capping power to a subset of the plurality of data center racks based on the priority order where the capping includes dynamic power capping for a lower priority subset of the plurality of data center racks.

38. The method of claim 1 further comprising:
obtaining data from the plurality of power sources;
classifying a subset of the plurality of power sources;
modeling behavior for the subset of the plurality of power sources; and
analyzing failure for the subset of the plurality of power sources based on the modeling.

39. The method of claim 1 further comprising rebalancing the two or more power loads to the at least two power sources after a certain duration, wherein the duration is periodic.

40. The method of claim 39 wherein the duration which is periodic is 60 seconds.

41. The method of claim 39 wherein the rebalancing entails reevaluating power demands and enabling power sources from the plurality of power sources in response to the reevaluating.

42. The method of claim 39 wherein the rebalancing entails reevaluating power demands and disabling power sources from the plurality of power sources in response to the reevaluating.

43. The method of claim 39 wherein the rebalancing entails reevaluating power demands and decoupling loads from the two or more power loads in response to the reevaluating.

44. An apparatus for data center power control comprising:
a memory which stores instructions;
one or more processors coupled to the memory wherein the one or more processors are configured to:
access a plurality of power sources which are coupled to two or more power loads;
detect power requirements for the two or more power loads;
enable at least two power sources from the plurality of power sources to match the power requirements of the two or more power loads wherein the enabling is a function of demand-side requirements, and wherein the enabling optimizes the at least two power sources to set the at least two power sources in an efficient power range, further comprising assigning a low priority load from the two or more power loads to a first power source from the at least two power sources and a high priority load from the two or more power loads to a second power source from the at least two power sources, wherein the second power source has fewer usage hours than the first power source; and
evaluate reliability for the plurality of power sources based on usage hours and control the at least two power sources from the plurality of power sources to enhance reliability of the plurality of power sources.

45. A computer program product embodied in a non-transitory computer readable medium for data center power control, the computer program product comprising code which causes one or more processors to perform operations of:
accessing a plurality of power sources which are coupled to two or more power loads;
detecting power requirements for the two or more power loads;
enabling at least two power sources from the plurality of power sources to match the power requirements of the two or more power loads wherein the enabling is a function of demand-side requirements, and wherein the enabling optimizes the at least two power sources to set the at least two power sources in an efficient power range, and wherein the enabling includes assigning a low priority load from the two or more power loads to a first power source from the at least two power sources and a high priority load from the two or more power loads to a second power source from the at least two power sources, wherein the second power source has fewer usage hours than the first power source; and
evaluating reliability for the plurality of power sources based on usage hours and controlling the at least two power sources from the plurality of power sources to enhance reliability of the plurality of power sources.

* * * * *